United States Patent [19]
Onishi et al.

[11] Patent Number: 6,041,274
[45] Date of Patent: Mar. 21, 2000

[54] POSITIONAL DEVIATION DETECTING DEVICE FOR A MOBILE BODY AND POSITION CORRECTING APPARATUS FOR A WORKING MACHINE MOUNTED ON A MOBILE BODY

[75] Inventors: Masanori Onishi; Masanao Murata; Yutaka Nakai; Katsumi Yasuda; Tsukasa Sugino; Susumu Nakagawa, all of Ise; Kouji Miura, Toyohashi, all of Japan

[73] Assignee: Shinko Electric Co., Ltd., Tokyo, Japan

[21] Appl. No.: 09/063,409

[22] Filed: Apr. 21, 1998

[30] Foreign Application Priority Data

| Apr. 21, 1997 | [JP] | Japan | 9-103301 |
| Dec. 9, 1997 | [JP] | Japan | 9-338529 |
| Dec. 9, 1997 | [JP] | Japan | 9-338530 |
| Jan. 23, 1998 | [JP] | Japan | 10-011311 |
| Feb. 18, 1998 | [JP] | Japan | 10-036064 |

[51] Int. Cl.[7] .................................................. G05D 1/00
[52] U.S. Cl. ............................. 701/26; 701/28; 701/202; 701/207; 701/210; 318/580; 318/587; 901/1
[58] Field of Search ........................... 701/26, 28, 202, 701/207, 210, 214, 300; 180/168, 169; 318/580, 587; 901/1, 3

[56] References Cited

U.S. PATENT DOCUMENTS

| 5,219,036 | 6/1993 | Schwager et al. | 701/26 |
| 5,446,356 | 8/1995 | Kim | 701/26 |
| 5,804,942 | 9/1998 | Jeong | 701/26 |

*Primary Examiner*—William A. Cuchlinski, Jr.
*Assistant Examiner*—Gertrude Arthur
*Attorney, Agent, or Firm*—Oblon, Spivak, McClelland, Maier & Neustadt, P.C.

[57] ABSTRACT

A pickup sensor for picking up an image on a floor is installed on a mobile body with a working machine mounted thereon in order to correct for the position deviation of a working machine due to possible deviation in the stop position of a mobile body to always ensure accurate working without increasing the working time of the overall system at the time of stopping the mobile body at a predetermined position and allowing said working machine to perform predetermined operation according to previously given teaching data. At the time the teaching data is given, the pickup sensor picks up an image (reference picked image) including a regular pattern and a predetermined identification mark formed on a floor. At the time the working machine works, the pickup sensor also picks up an image (on-pause picked image) on the floor surface at the stop position. The reference picked image is compared with the on-pause picked image based on the position of the identification mark, and the teaching data of the working machine is corrected on the basis of the comparison result. This correction does not involve the operation of the movable portions of the working machine or the like and can be accomplished by using an operation switching time which exists between the time when the mobile body has stopped and the time the working machine initiates an operation.

31 Claims, 27 Drawing Sheets

Fig. 11
(a) Template for detecting an identification mark
(b) Template for detecting a punching hole
Fig. 12
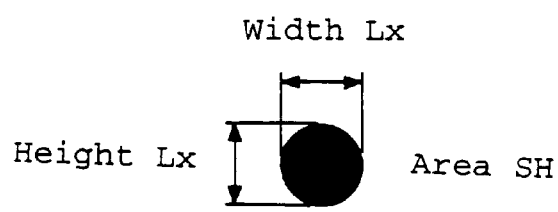

Fig.14

| On-teaching coordinate values $(T_1x, T_1y)$ of punching hole bB | On-working coordinate values $(P_1x, P_1y)$ of punching hole bB |
|---|---|
| On-teaching coordinate values $(T_2x, T_2y)$ of punching hole bC | On-working coordinate values $(P_2x, P_2y)$ of punching hole bC |
| On-teaching coordinate values $(T_3x, T_3y)$ of punching hole bD | On-working coordinate values $(P_3x, P_3y)$ of punching hole bD |

. .
. .
. .

| On-teaching coordinate values $(T_{n-1}x, T_{n-1}y)$ of punching hole eD | On-working coordinate values $(P_{n-1}x, P_{n-1}y)$ of punching hole eD |
|---|---|
| On-teaching coordinate values $(T_nx, T_nx)$ of punching hole eE | On-working coordinate values $(P_nx, P_nx)$ of punching hole eE |

Mirror-finish treatment black-color irregular reflection treatment (a)　　　　　　　　(b)

POSITIONAL DEVIATION DETECTING DEVICE FOR A MOBILE BODY AND POSITION CORRECTING APPARATUS FOR A WORKING MACHINE MOUNTED ON A MOBILE BODY

BACKGROUND OF THE INVENTION

1. Field of the Invention

The present invention relates to an apparatus for detecting the amount of deviation of the stop position of a mobile body with, for example, a working machine mounted thereon, from a predetermined stop position, and an apparatus for position correction for the working machine based on the amount of deviation of the stop position.

2. Description of the Prior Art

In manufacturing processes or the like, robots mounted on unmanned carriages are typically used, each of which is designed in such a manner that as an unmanned carriage (mobile body) with a robot (working machine) mounted thereon stops at a predetermined work position, the robot performs a predetermined work at the stop position. According to this type of machine, the robot works in accordance with teaching data, which was previously acquired with the unmanned carriage stopped at the work position. However, generally, the position precision of the unmanned carriage is low and it is difficult to precisely stop the unmanned carriage at the stop position at which the teaching data was acquired. The relative position between the actual stop position of the unmanned carriage and an intended work position varies frequently. This requires correction to reflect an error in the stop position of the unmanned carriage in the teaching data. One way of correcting the position of such a robot mounted on an unmanned carriage is disclosed in, for example, Japanese Patent Publication No. 9151 of 1996 (hereinafter called prior art) An arm-equipped unmanned carriage A0 according to this prior art is constructed as shown in FIG. 27. An unmanned carriage 131 has an arm 132 so constructed as to be able to rotate horizontally and move to and fro as well as up and down. A pickup sensor 133 and a hand 134 are attached to the front end of the arm 132. Furthermore, a work 136 which is to be grabbed and moved by the hand 134 of the arm 132 is placed on a workbench 135 at a predetermined position. A mark 137 consisting of two points 137a and 137b is provided on the upper face of the workbench 135. The unmanned carriage 131 runs among a plurality of workbenches 135, and stops at a predetermined position in front of each workbench 135 and carries out predetermined work on the work 136 using the arm 132 in accordance with the previously given teaching data.

A description will be given of a means that the arm-installed unmanned carriage A0 with the above structure accurately implements the operation with the arm 132, regardless of an error or deviation of the stop position in front of each workbench 135 from the original stop position where the teaching data was acquired.

First, at the time of teaching the operations to the arm 132 prior to the actual work, a normal intended work position and a point for picking up the mark 137 are taught. Specifically, the pickup sensor 133 is moved directly above the mark 137 and this position is taught, then the mark 137 is picked up by the pickup sensor 133 and the obtained picked image is subjected to predetermined image processing to acquire the coordinate position (called teaching-time coordinate position) of the marks 137a and 137b on the picked image, and the coordinate position is stored in memory.

Next, after the unmanned carriage 131 stops in front of the workbench 135 to work, first, the arm 132 moves the pickup sensor 133 above the mark 137 to pick up the mark 137 according to the taught procedures, performs predetermined image processing on the acquired picked image to obtain the coordinate position (called work-time coordinate position) of the marks 137a and 137b on the picked image. Because the positioning precision of the unmanned carriage 131 is generally poor, the teaching-time coordinate position acquired at the time of teaching often does not match with the work-time coordinate position. In this case, a conversion equation is obtained based on the amount of position deviation between the teaching-time coordinate position and the work-time coordinate position and the teaching data (which indicates the intended work position) of the arm 132 is corrected according to the equation.

The above-described process allows the arm 132 to accurately work irrespective of the amount of deviation of the stop position of the unmanned carriage 131.

The means of the prior art however requires that after the unmanned carriage 131 stops in front of each workbench 135 and before it starts the actual work with the arm 132, the arm 132 should be operated to conduct the following processes.

① Manipulate the arm 132 to move the pickup sensor 133 over the mark 137.

② Pick up the mark 137 by means of the pickup sensor 133 and perform image processing.

③ Correct the teaching data.

These processes involve the operation of the arm 132 and thus take time, during which the arm 132 cannot proceed to the next work, and are thus critical factors to increase the working time of the overall system.

As an arm has many parts which may cause control errors, such as the link portions and driving portions, it is ideal from the viewpoint of precision to correct an error at the front end of the arm, which is closest to the point of action, in order to operate the arm precisely with respect to a work. Conventionally, the above-described correction has been executed along this idea. The recent technical improvements however can reduce the control errors to such a level that error correction at the arm's free end is not necessarily required.

SUMMARY OF THE INVENTION

Accordingly, it is the object of the present invention to provide a position correcting apparatus of the working machine for correcting the position deviation of a working machine due to deviation in the stop position of a mobile body to always ensure accurate working without increasing the working time of the overall system, and a stop-position deviation detecting device for the mobile body, which is designed for the position correcting apparatus.

To achieve the above object, one aspect of this invention provides a position correcting apparatus for a working machine mounted on a mobile body for stopping the mobile body at a predetermined work position on a floor surface with a regular pattern formed thereon, and allowing the working machine to perform a predetermined operation according to teaching data, previously prepared and given to the working machine with the mobile body stopped at a reference stop position at the work position, which apparatus comprises image pickup means, provided on the mobile body at a position near the floor, for picking up an image on the floor surface where the mobile body stops; reference picked image acquiring means for, a time of giving the teaching data to the working machine, for acquiring a reference picked image including an image of the regular pattern and an image of a identification mark provided on the floor surface in the vicinity of the predetermined work position, both acquired by the image pickup means with the mobile body stopped at the reference stop position of the work position; on-pause picked image acquiring means for acquiring an on-pause picked image including images of a regular pattern and the identification mark acquired by the image pickup means at a stop position of the mobile body when stopped; and teaching data correction means for comparing the regular pattern in the reference picked image, obtained by the reference picked image acquiring means, with the regular pattern in the on-pause picked image, obtained by the on-pause picked image acquiring means, based on a position of the above identification mark, and correcting the teaching data of the working machine based on a result of a comparison.

The teaching data correction means may be designed to compare predetermined position information or image information, obtained from the regular pattern in the reference picked image, with predetermined position information or image information, obtained from the regular pattern in the on-pause picked image, and corrects the teaching data of the working machine based on a result of the comparison.

As a floor with a regular pattern, a punching member or a grating member, which is typically used in a semiconductor clean room or the like, may be used as it is.

If the identification mark is subjected to a surface treatment optically different from that of individual constituting elements of the regular pattern, the identification mark on the picked image has a different brightness from that of the pattern on the floor surface, thus ensuring easy detection of the identification mark from the picked image. This can assure more accurate image processing using the picked image so that an improvement on the precision of detection of the amount of position deviation can be expected.

The available surface treatment may be a low reflection treatment, an irregular reflection treatment, or a mirror finish treatment. In the case of the mirror finish treatment, if the surface is further formed like a convex or concave spherical surface, even when the identification mark is not positioned directly under the image pickup means, intense reflection from illumination surely appears on the surface so that a clear picked image can always be obtained by the image pickup means.

If the identification mark is embedded in the floor or is fitted in through a hole constituting the regular pattern, it is possible to prevent the identification mark from interfering with the running of the mobile body.

If an illuminator is provided near the image pickup means, and a reflector is provided to condense light emitted from the illuminator in a field of view of the image pickup means on the floor surface, the individual portions of the picked image have a uniform brightness. This ensures more accurate and easier image processing using the picked image so that a further improvement on the precision of detection of the amount of position deviation can be expected.

A plurality of image pickup means may be provided with a predetermined position relationship, and the teaching data correction means may be designed to correct the teaching data of the working machine based on a result of comparison between the on-pause picked image and the reference picked image, both acquired by each of image pickup means. This modification can detect the amount of position deviation of the body of the mobile body based on a wider range of information, as in the case where image pickup means having a wider field of view including the image pickup areas of the plurality of image pickup means is used. Furthermore, the accuracy of image identification is not lowered. Therefore, it becomes possible to improve the accuracy of position deviation in the rotation direction without a pickup means having to use a special wide field of sight.

To achieve the above object, another aspect of this invention provides a stop-position deviation detecting device for obtaining a deviation between an on-pause picked image, acquired by picking up an image of a predetermined flat surface which has an arbitrary pattern and a predetermined identification mark formed thereon and on which a mobile body moves, with the mobile body stopped at a predetermined position, and a reference picked image, acquired by picking up an image of the flat surface, with the mobile body previously stopped at a predetermined reference stop position, by comparing the arbitrary patterns on the picked images with respect to the identification mark taken as a reference, thereby detecting an amount of deviation of the stop position of the mobile body based on the deviation, which the apparatus comprises reference position data acquiring means for acquiring, from the reference picked image, position data of a plurality of pattern components constituting the arbitrary pattern and the identification mark on the reference picked image; on-pause position data acquiring means for acquiring, from the on-pause picked image, position data of the plurality of pattern components and the identification mark on the on-pause picked image; code assigning means for assigning common codes to the plurality of pattern components with the identification mark on each of the picked images taken as a reference; associating means for associating the plurality of pattern components between the picked images in one-to-one correspondence based on the codes of the plurality of pattern components given by the code assigning means; and deviation calculation means for acquiring a difference between the position data acquired by the reference position data acquiring means and the on-pause position data acquiring means for each of sets of the plurality of pattern components associated with one another by the associating means, and acquiring a deviation between the picked images based on the difference in the position data in each set.

Further, the position deviation detecting device may be modified in such a way that a predetermined number of pieces of position data are selected from said position data of said pattern components, obtained by said reference position data acquiring means and said on-pause position data acquiring means, and said associating means performs an association process only on those pattern components corresponding to the selected position data. This structure can improve the processing speed and contribute to reducing the memory capacity while maintaining a certain degree of greater precision.

The on-pause position data acquiring means may be designed to include rough position data acquiring means for acquiring rough position data of the plurality of pattern components; rough position data selection means for selecting a predetermined number of pieces of position data from the rough position data acquired by the rough position data acquiring means; and detailed position data acquiring means for acquiring detailed position data of the plurality of pattern components corresponding to the rough position data selected by the rough position data selection means. This structure can ensure faster processing and smaller memory capacity.

In the case where the arbitrary pattern is formed by a regular arrangement of the plurality of pattern components, the code assigning means may be designed to assign codes based on regularity of the arrangement of the plurality of pattern components with the identification mark on each of the picked images taken as a reference. This can assure an easy and accurate code assignment.

On the other hand, if the arbitrary pattern is formed by an irregular arrangement of the plurality of pattern components, the aforementioned code assigning means cannot be used. This case can cope with a structural modification wherein the code assigning means assigns codes to individual pattern components on the reference picked image based on vectors connecting the plurality of pattern components in order on the reference picked image with the identification mark as a starting point, and assigns codes common to those on the reference picked image, on the on-pause picked image with the identification mark as a starting point, according to the vectors.

The reference position data acquiring means and the on-pause position data acquiring means may perform a matching process on a predetermined template image and images of the plurality of pattern components and the identification mark to recognize the plurality of pattern components and the identification mark to thereby acquire position data on each picked image. This can accomplish highly accurate position data. In this case, if the plurality of pattern components of the arbitrary pattern are formed in the same circle, a fast matching process with less memory usage can be accomplished regardless of a pose deviation between the template image and each picked image, by using the image of one of the circular pattern components as the predetermined template image.

If the reference position data acquiring means and the on-pause position data acquiring means are designed to extract portions which have preset shape properties from the binary images being obtained by binarizing individual picked images with a predetermined threshold value, to recognize the plurality of pattern components and the identification mark to thereby acquire position data of the picked images, the processing speed can be increased though the precision does not reach that of the matching process.

In the case where the above pattern components constituting the arbitrary pattern, one or more pattern components are specifiable as the identification mark, and such pattern components can be taken as a reference in the process executed by the code assigning means.

The predetermined flat surface may be a floor surface made of a punching member or a grating member.

If the identification mark is subjected to a surface treatment optically different from that of individual constituting elements of the regular pattern, the identification mark on the picked image has a different brightness from that of the pattern on the floor surface face, thus ensuring easy detection of the identification mark from the picked image. This ensures more accurate image processing using the picked image so that an improvement on the precision of detection of the amount of position deviation can be expected.

The available surface treatment may be a low reflection treatment, an irregular reflection treatment, or a mirror finish treatment. In the case of the mirror finish treatment, if the surface is further formed like a convex or concave spherical surface, even when the identification mark is not positioned directly under the image pickup means, intense reflection from the illumination surely appears on its surface so that a clear picked image can always be obtained by the image pickup means.

If the identification mark is embedded in the floor or is fitted in a through hole constituting the regular pattern, it is possible to prevent the identification mark from interfering with the running of the mobile body.

If an illuminator is provided near the image pickup means, and a reflector is attached to condense light emitted from the illuminator in a field of view of the image pickup means on the floor surface, the individual portions of the picked image have a uniform brightness. This ensures more accurate and easier image processing using the picked image so that a further improvement on the precision of detection of the amount of position deviation can be expected.

A plurality of image pickup means may be provided with a predetermined position relationship, and the teaching data correction means may be designed to correct the teaching data of the working machine based on a result of comparison between the on-pause picked image and the reference picked image, both acquired by the each image pickup means. This modification can detect the amount of position deviation of the body of the mobile body based on a wider range of information, as in the case where image pickup means having a wider field of view including the image pickup areas of the plurality of image pickup means is used. Furthermore, the accuracy of image identification is not lowered. Therefore, it will become possible to improve the accuracy of position deviation in the rotation direction without use of a pickup means having a special wide field of sight.

The position deviation detecting device may be designed in such a way that the amount of a three-dimensional deviation of the stop position of the mobile body is obtained based on relationships among positions of the pattern components on the on-pause picked image and the reference picked image. This structure can accurately detect the amount of position deviation even when the position relationship between the mobile body and the flat surface (for example, a floor surface) changes three-dimensionally between the time of giving teaching data and the working time as in the case where, for example, the mobile body tilt due to falling of its wheels or the like or the height position of the image pickup means from the flat surface varies due to wearing of the wheels.

The position correcting apparatus for a working machine with respect to the first aspect of this invention can carry out fast correction in a slight time from the point at which the mobile body has stopped to the beginning of the operation of the working machine, without operating movable portions, such as the working machine. As the working machine can quickly initiate transfer work according to already corrected teaching data, the work time of the overall system does not increase.

The stop-position deviation detecting device for a mobile body according to the second aspect of this invention is adaptable in the case where a predetermined flat surface (for example, a floor surface) does not have a grating pattern, and is able to ensure high precision measurement due to the use of multiple sets of position data in acquiring positional and posture deviations. As position data of each of the pattern components is used, even a productional error, if included in the position of any of the pattern components, does not affect the measuring precision.

BRIEF DESCRIPTION OF THE DRAWINGS

FIG. 11 is a diagram showing a template image to be used in a template matching process;

FIG. 12 is a diagram showing an example of a shape property;

FIG. 14 is a diagram exemplifying position data of associated punching holes;

DETAILED DESCRIPTION OF THE PREFERRED EMBODIMENTS

A preferred embodiment and examples of the present invention will now be described with reference to the accompanying drawings to help understand this invention. The embodiment and examples which will be discussed below are to be considered as illustrative and not restrictive of the technical scope of the invention.

This embodiment will be described with reference to an arm-installed unmanned carriage A1 which conveys and transfers wafers between semiconductor equipment or between semiconductor equipment and a stocker in a semiconductor clean room.

Figure 1:
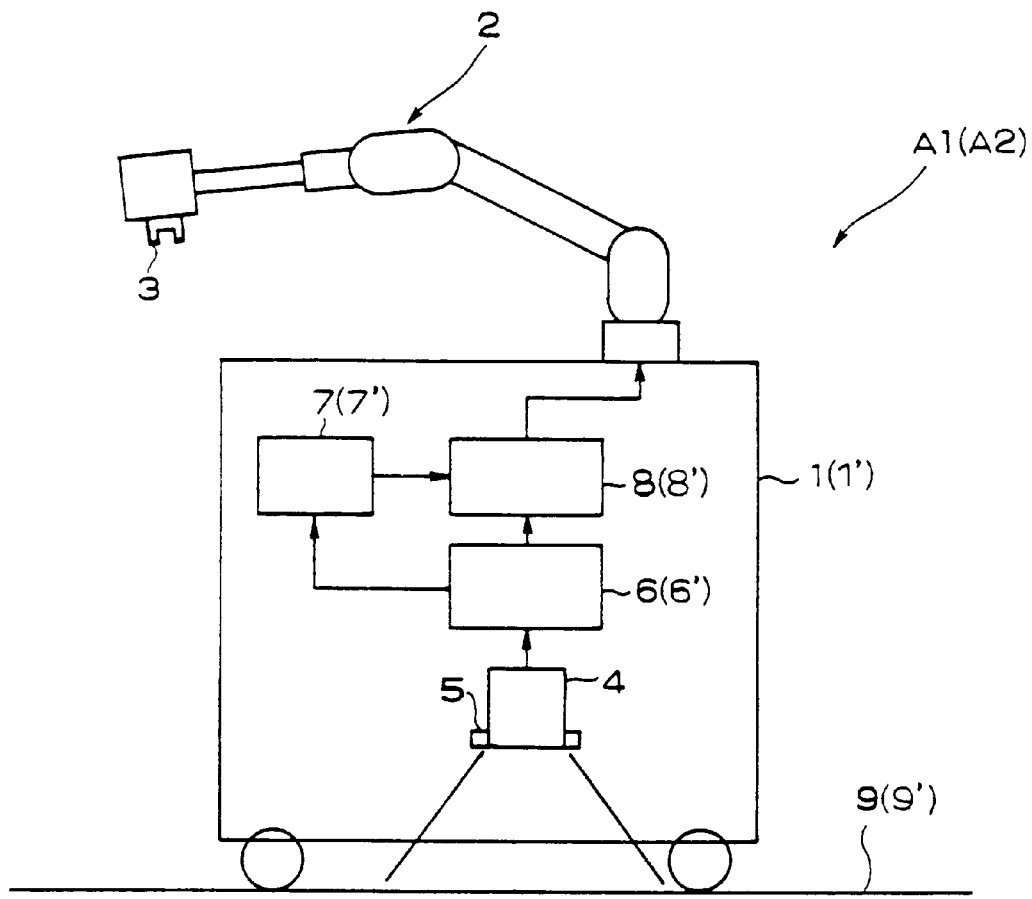
FIG. 1 is an exemplary diagram illustrating the schematic structure of an arm-installed unmanned carriage A1 (A2) according to one embodiment (embodiment 1) of this invention.
Figure 5:
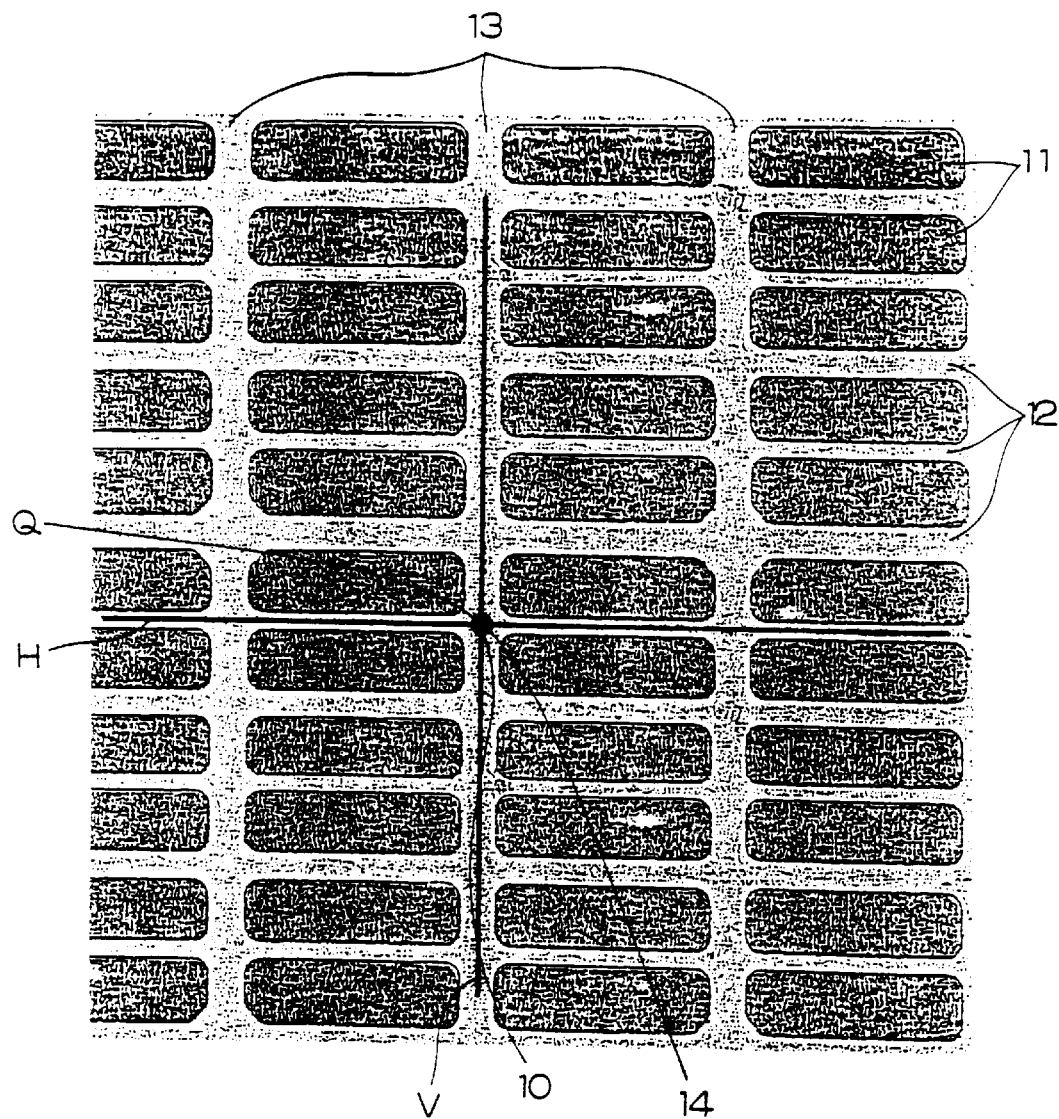
FIG. 5 is a diagram exemplifying the pattern of a punching floor surface (grating floor surface)
Figure 6:
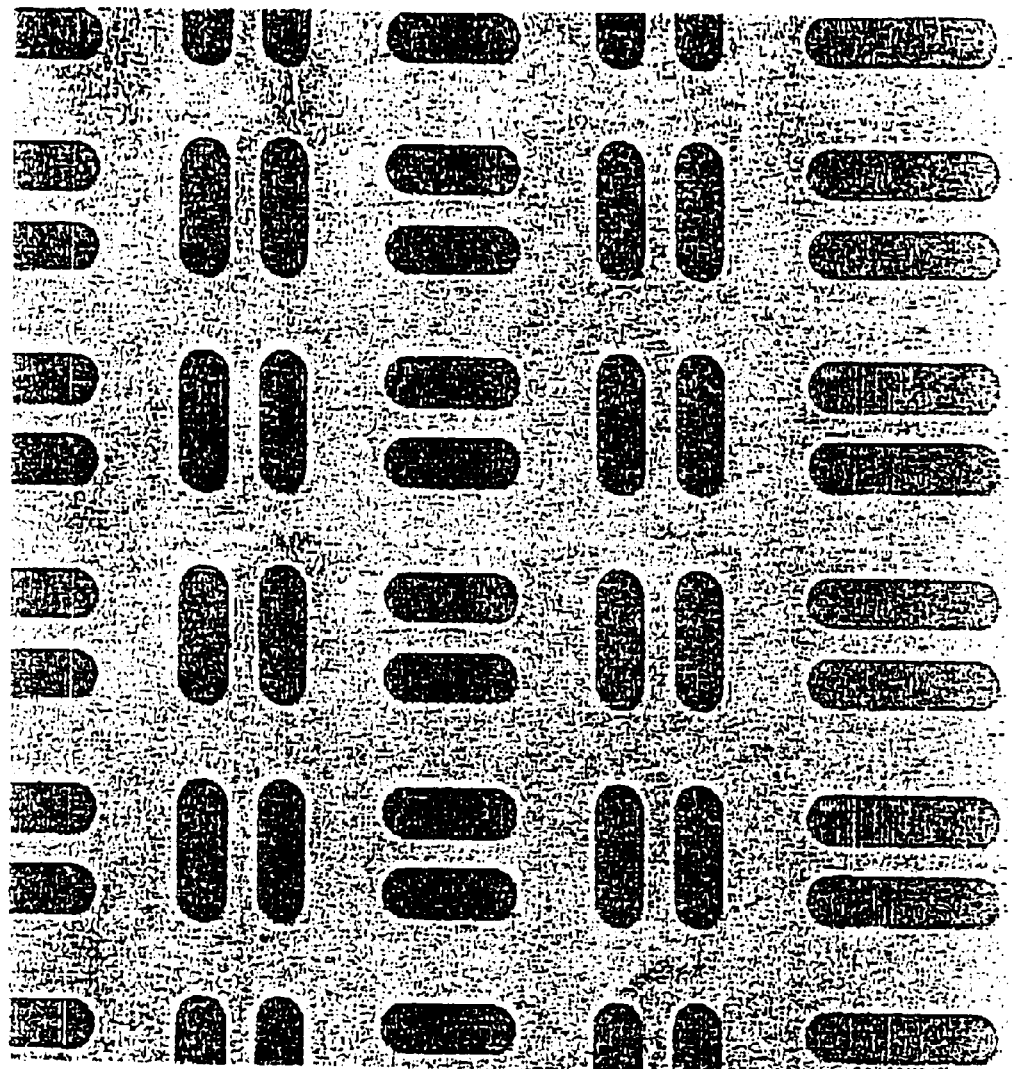
FIG. 6 is a diagram showing another pattern of a punching floor surface (grating floor surface)
Figure 7:
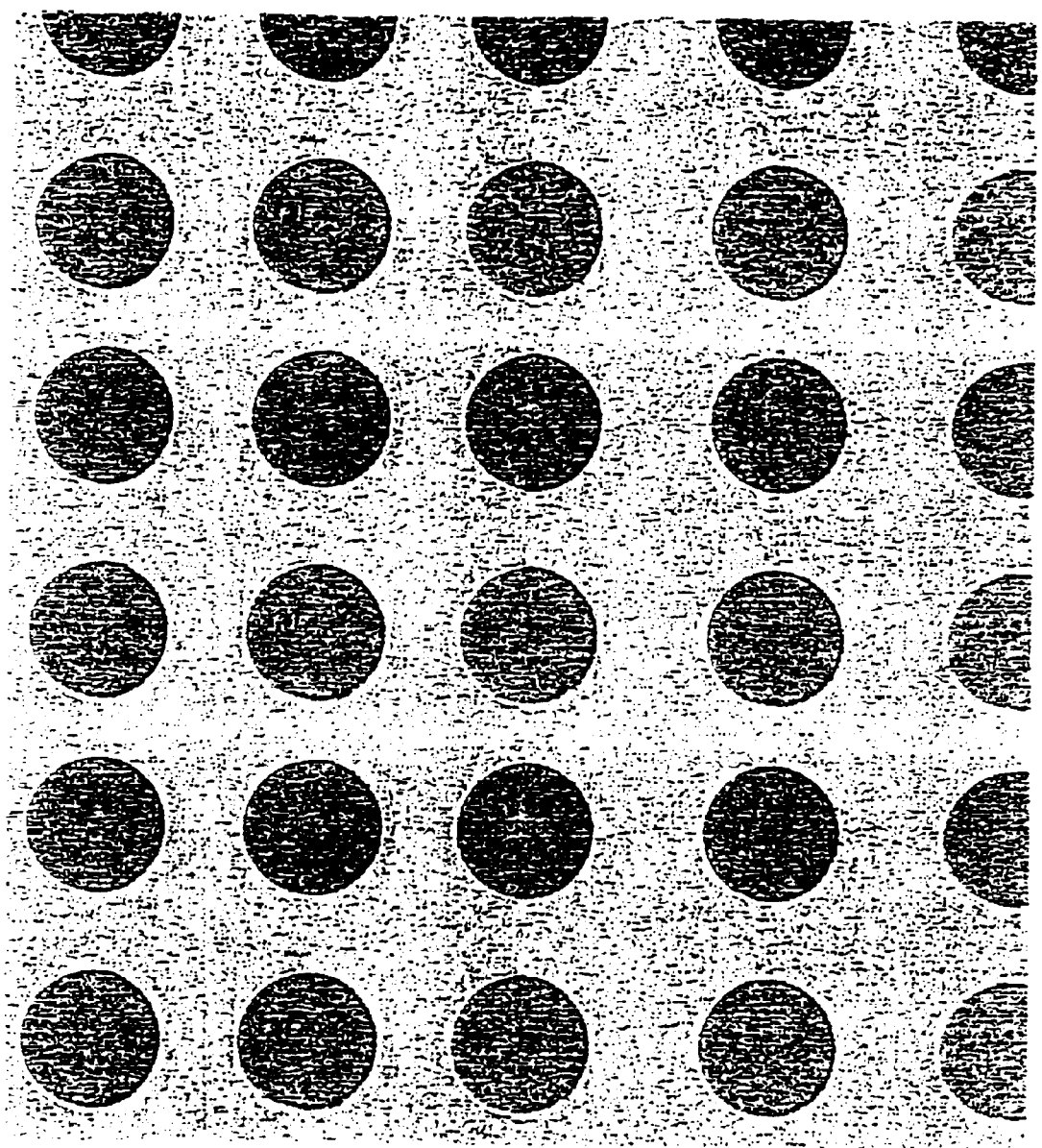
FIG. 7 is a diagram depicting a different pattern of a punching floor surface (grating floor surface)
Figure 8:
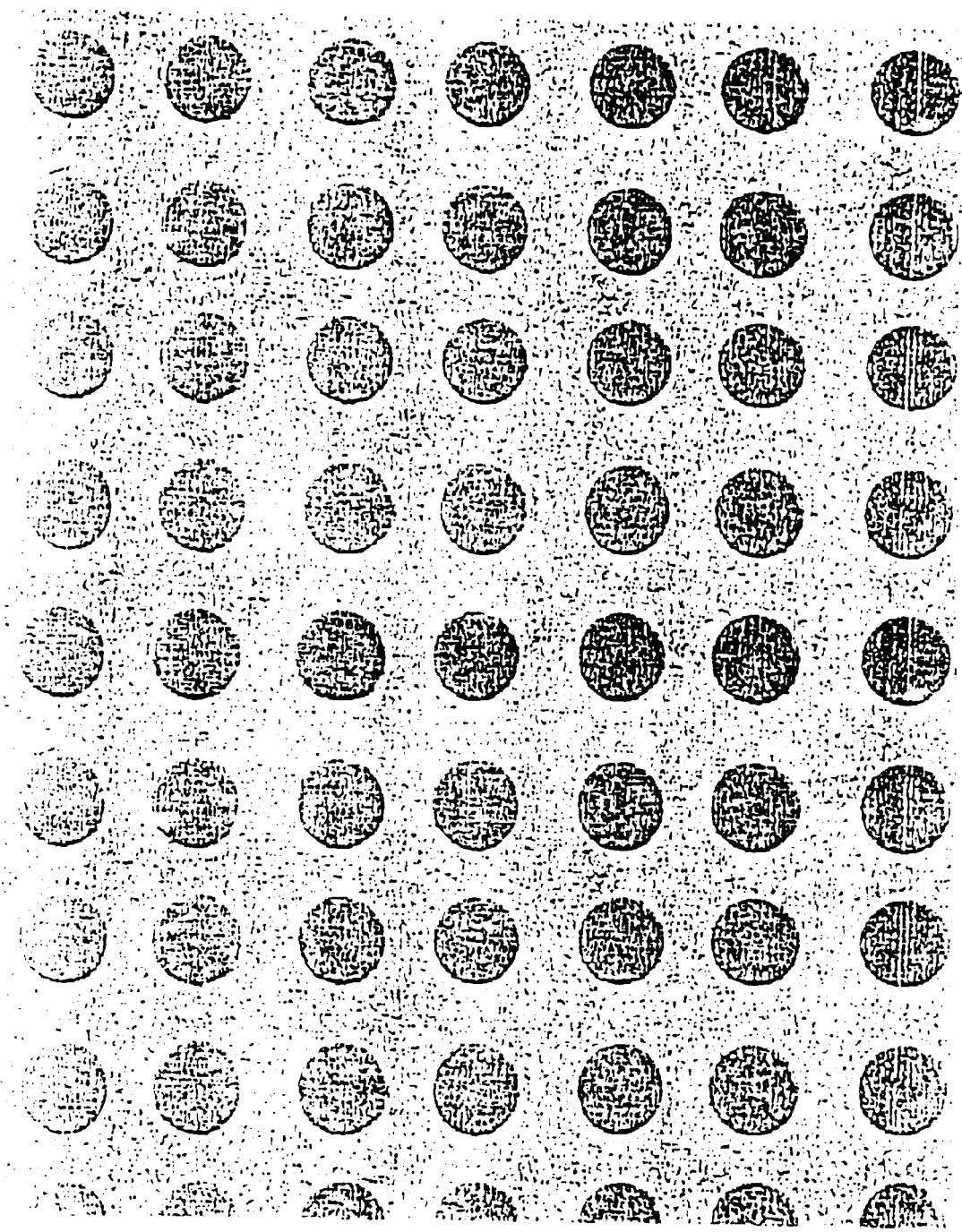
FIG. 8 is a diagram showing a further pattern of a punching floor surface (grating floor surface)
Figure 27:
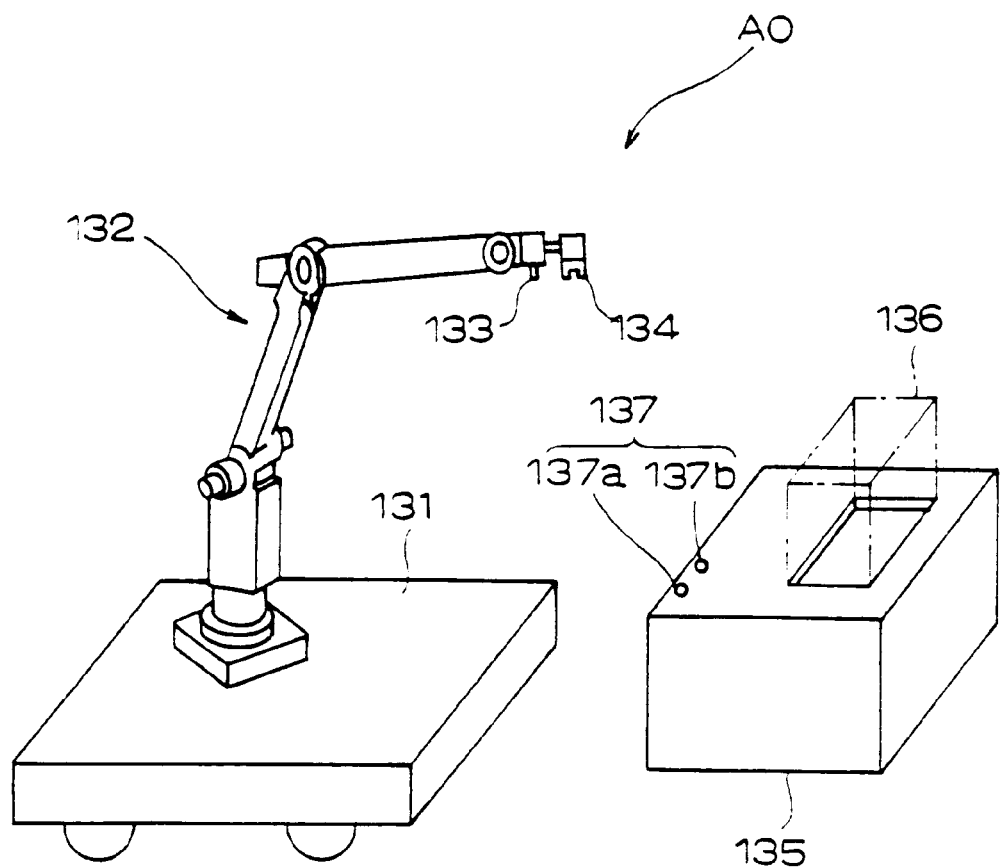
FIG. 27 is an exemplary diagram showing the schematic structure of an arm-installed unmanned carriage A0 according to the prior art.

As shown in FIG. 1, the arm-installed unmanned carriage A1 comprises an unmanned carriage 1 (one example of a mobile body) on which an arm 2 (one example of a working machine) having a hand 3 at its front end is mounted. The arm 2 is designed to work like the conventional arm 132 (FIG. 27), except that it is not equipped with the pickup sensor 133. Near the lower center portion of the unmanned carriage 1 (where illumination or the like does not affect much) is secured a pickup sensor 4 with a ring-shaped illuminator 5, which faces a floor surface 9. An image processor 6, a storage section 7, and a teaching data corrector 8 are further provided in the unmanned carriage 1. A punching floor with a predetermined pattern of punching holes, as exemplified in FIGS. 5 through 8, are laid on a floor surface 9 (the punching floor shown in FIG. 5 is used in the following description). As shown in FIG. 5, a plurality of horizontal frames 12 and a plurality of vertical frames 13 perpendicular to the former frames are formed on the punching floor 9 by punching holes 11. Further, a identification mark 10 as shown in FIG. 5 is provided on the punching floor 9 near the stop position of the unmanned carriage 1 and near intersection, 14, of an arbitrary horizontal frame 12 and an arbitrary vertical frame 13. The identification mark 10 should properly be provided in such a vicinity of intersection 14 as to be able to specify the intersection 14.

The aforementioned constituting elements will be described more specifically.

An operation for transferring wafers (not shown) from the unmanned carriage 1 to a workbench (not shown) has previously been taught to the arm 2 with the unmanned carriage 1 stopped at a predetermined work position. In the actual transfer work, the arm 2 works according to this teaching data.

The pickup sensor 4 picks up the image of the punching floor 9 including the identification mark 10 at the time arm 2 is taught the operation and when the unmanned carriage 1 is stopped at a predetermined work position for transfer work.

The image processor 6 performs image processing on the picked image sent from the pickup sensor 4 after image pickup by the pickup sensor 4 to extract a line H and a line V from the horizontal frame 12 and the vertical frame 13 which forms the intersection 14 where the identification mark 10 is provided, and acquires the positional coordinates of a point of intersection Q between the lines H and V on the picked image in the local coordinate system and the rotational angle (hereinafter called positional information). The positional information obtained at the time of teaching the operation to the arm 2 is stored in the storage section 7.

After the unmanned carriage 1 has stopped at a predetermined work position for transfer work and the image processor 6 has finished its processing, the teaching data corrector 8 correct the teaching data of arm 2 based on the difference between the positional information previously stored in the teaching data corrector 7 and the positional information currently acquired by the image processor 6, i.e., based on the amount of deviation of the stop position of the unmanned carriage 1.

Figure 2:
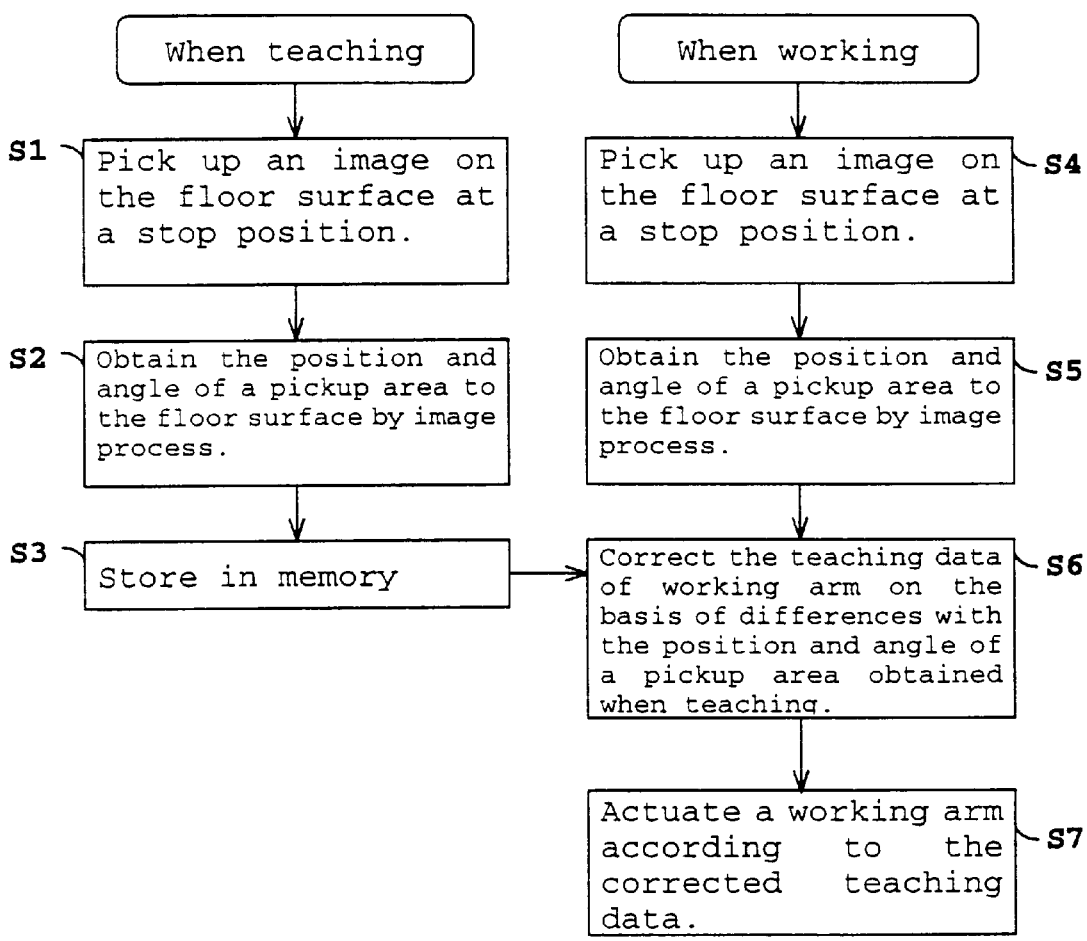
FIG. 2 is a flowchart illustrating procedures of a stop position correcting process which is carried out by the arm-installed unmanned carriage A1.

Hereinafter, the position correcting operation of the arm-installed unmanned carriage A1 will be described more specifically with reference to the flowchart illustrated in FIG. 2.

Figure 3:
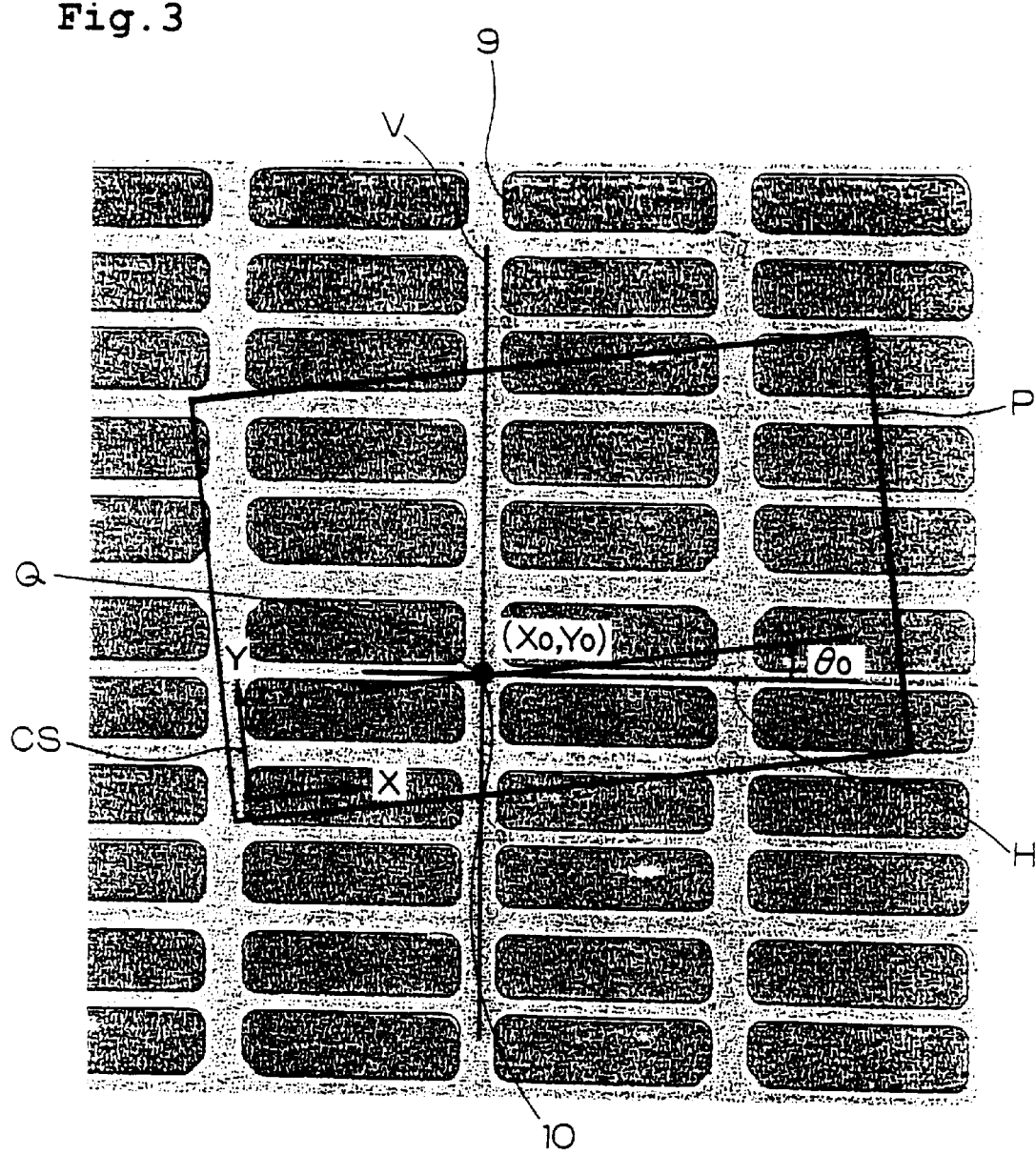
FIG. 3 is an explanatory diagram exemplifying how to compute positional information (positional coordinates ($X_0$, $Y_0$), rotational angle ($\theta_0$) at the time of teaching.

Prior to the actual transfer work, with the unmanned carriage 1 stopped at a predetermined work position, operation for transferring wafers (not shown) from the unmanned carriage 1 to a workbench (not shown) is taught to the arm 2. At this time, the pickup sensor 4 picks up the image of the punching floor 9 (step S1). Subsequently, the image processor 6 performs image processing on the picked image given from the pickup sensor 4 to extract line H and line V from the horizontal frame 12 and the vertical frame 13 which forms intersection 14 where the identification mark 10 is provided, and acquires the positional information (positional coordinates $(X_0, Y_0)$, rotational angle $\theta_0$) of the intersection point Q between the lines H and V on the picked image in the local coordinate system (step S2). This positional information is obtained in the form of positional coordinates $(X_0, Y_0)$ of the intersection point Q on an image pickup area P in the local coordinate system CS and the rotational angle $\theta_0$ which is formed by the line H and the X axis in the local coordinate system CS, as shown in FIG. 3. The positional information obtained in this manner is stored in the storage section 7 (step S3).

At the time of the actual work, when the unmanned carriage 1 stops at a predetermined work position, the pickup sensor 4 picks up the image of the punching floor 9 (step S4). Then, the image processor 6 performs image processing on the picked image supplied from the pickup sensor 4 to extract the line H and the line V from the horizontal frame 12 and the vertical frame 13 which forms the intersection 14 where the identification mark 10 is provided, and acquires the positional information (positional coordinates $(X_1, Y_1)$, rotational angle $\theta_1$) of the intersection point Q between the lines H and V on the picked image in the local coordinate system (step S5).

Figure 4:
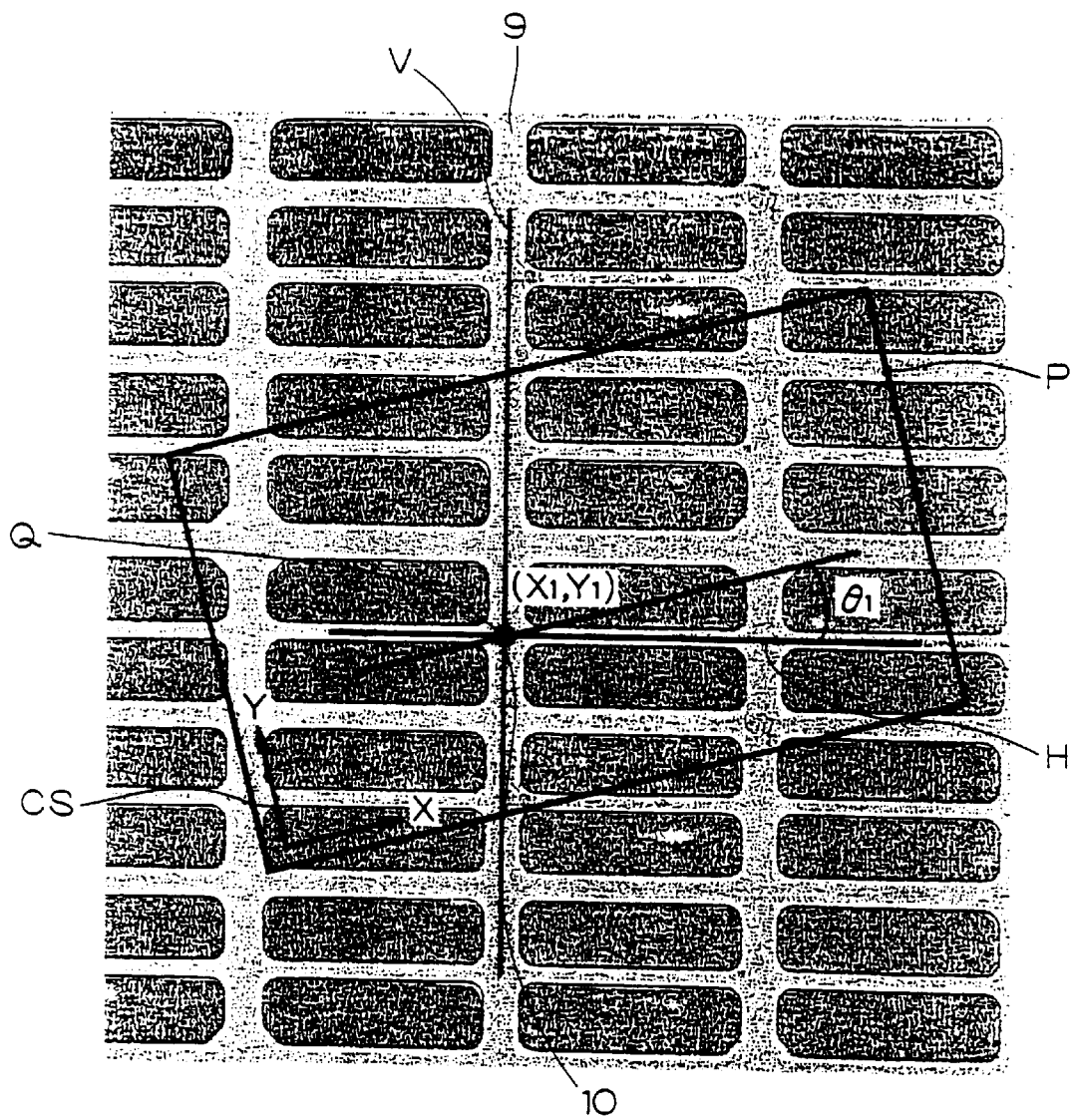
FIG. 4 is an explanatory diagram exemplifying how to compute positional information (positional coordinates ($X_1$, $Y_1$), rotational angle ($\theta_1$) at a working time.

This positional information is obtained in the form of the positional coordinates $(X_1, Y_1)$ of the intersection point Q on the image pickup area P in the local coordinate system CS and the rotational angle $\theta_1$ which is formed by the line H and the X axis in the local coordinate system CS, as shown in FIG. 4, as in the aforementioned step S2. As the positioning precision of the unmanned carriage 1 is generally low, the positional information (positional coordinates $(X_0, Y_0)$, rotational angle $\theta_0$) obtained in step S2 at the time of teaching and the positional information (positional coordinates $(X_1, Y_1)$, rotational angle $\theta_1$) obtained in this step S5 do not often match with each other. Accordingly, the teaching data corrector 8 acquires the difference between the positional information (positional coordinates $(X_0, Y_0)$, rotational angle $\theta_0$) obtained in step S2 at the teaching time and stored in the storage section 7, and the positional information (positional coordinates $(X_1, Y_1)$, rotational angle $\theta_1$) obtained in step S5, i.e., the amount of deviation of the stop position between the teaching time and the working time and corrects the teaching data of the arm 2 based on the acquired amount of positional deviation (step S6). The arm 2 carries out the transfer work in work position the teaching data corrected in step S6 (step S7). Thereafter, every time the unmanned carriage 1 moves, the steps S4 to S7 are repeated.

As explained above, the arm-installed unmanned carriage A1, according to this embodiment, corrects the teaching data of the arm 2 using the image of the floor surface, picked up by the pickup sensor 4 provided on the unmanned carriage 1 near the floor surface, and can thus execute a fast correction without operating movable portions, like the arm 2. Further, correction of the teaching data can be performed in the operation switching time that exists between the point at which the unmanned carriage 1 has stopped and the beginning of the transfer operation of arm 2, which initiates the transfer work according to the already corrected teaching data. As a result, the work time of the overall system does not increase.

Furthermore, the use of the pattern of a punching floor, which is typically used in a semiconductor clean room or the like, and a identification mark provided on the punching floor eliminates the need to provide a identification mark near an intended work position of semiconductor equipment. This improves space efficiency.

Moreover, as the pickup sensor 4 is located at the lower portion of the unmanned carriage 1 where it is less likely to be affected by illumination or the like, illumination can be given under constant conditions to provide stable images, which can always ensure accurate image processing.

Although the positional information (the positional coordinates and the rotational angle) are obtained from the picked images and stored at both the time of teaching and the working time, the teaching data of the arm is corrected based on the difference between positional information in this embodiment, image information of the images picked up at the teaching time and the working time may themselves be stored and compared with each other directly to obtain a difference based on which the teaching data of arm 2 is corrected.

Instead of the positional information of the point Q of intersection between the lines H and V, the positional information of the identification mark 10 may be used.

This invention is not limited to the above embodiment in which the pattern of the punching floor which is generally used in a semiconductor clean room or the like and the identification mark provided on a part of the punching floor are used to acquire the positional information (the positional coordinates and the rotational angle), but may be adapted to another type of floor which can specify the position and inclination of an image pickup area with respect to the floor surface. For example, a floor with some design on or a mosaic floor may be used as well. A pattern or design need not be formed on the entire floor surface; for example, a identification mark like two points, a rectangle or an arrow may be provided only in the vicinity of the stop position of the unmanned carriage.

Embodiment 1

The position correcting means according to the above embodiment cannot cope with a case where reference lines equivalent to the lines H and V cannot be defined as in the case where the pattern (punching holes 11) on the floor surface is not laid like a grating. Even when the pattern on the floor surface is laid like a grating, the positions of the punching holes 11 include errors which were made at the time of manufacture and which affect the setting precision of the lines H and V, thus lowering the precision in position correction. As only an image near the vertical and horizontal frames which pass the identification mark 10 is used, there is a limit to improvement on the precision. Further, if the punching hole 11 of an interest cannot be recognized due to some disturbance created by the illuminator or the like located under the floor, the position correction itself becomes impossible.

Figure 28:
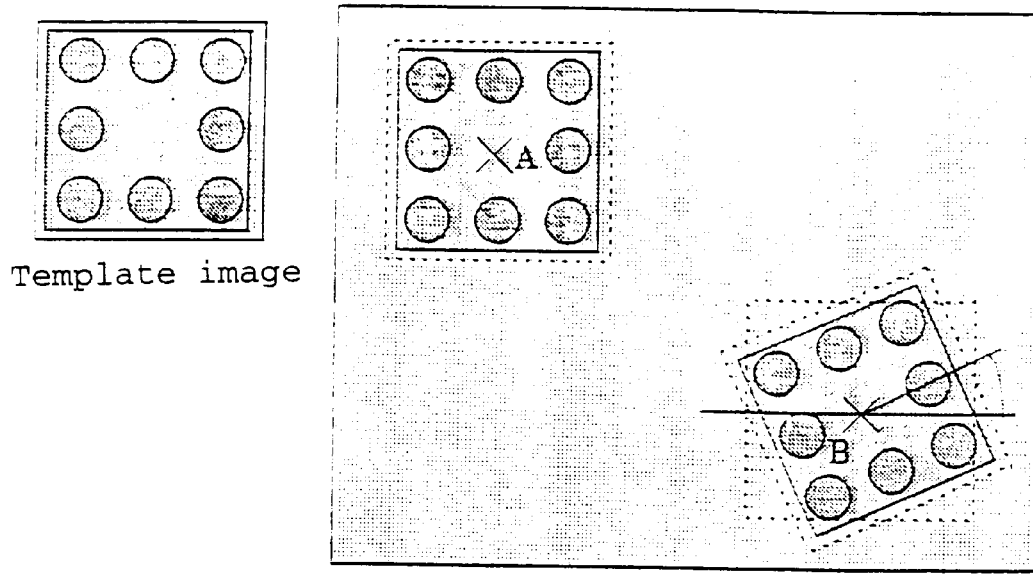
FIG. 28 is an explanatory diagram of a conventional typical template matching process.

In acquiring a deviation between a picked image at the teaching time and a picked image at the working time (when the unmanned carriage is stopped), instead of using the positional coordinates of the intersection point Q and the rotational angle between the lines H and V as done in the above embodiment, the image of the floor surface may be stored as a template image, which together with the individual picked images may be later subjected to a matching process to acquire the positions of the individual picked images and a posture deviation there between. This means, as shown in FIG. 28 can easily detect a picked image A which has the same posture (rotational angle) as the template image, but, for a picked image B whose posture (rotational angle) differs from that of the template image, requiring that the matching process should be repeated while gradually rotating the template image or while switching multiple templates of slightly variable rotational angles, previously stored in memory, from one to another. This means suffers from such a problem that the matching process takes significant time or a large memory area needed to store multiple template images.

Those shortcomings can be overcome by an arm-installed unmanned carriage A2 (FIG. 1), which is one example of the second aspect of this invention and will be discussed shortly.

Figure 10:
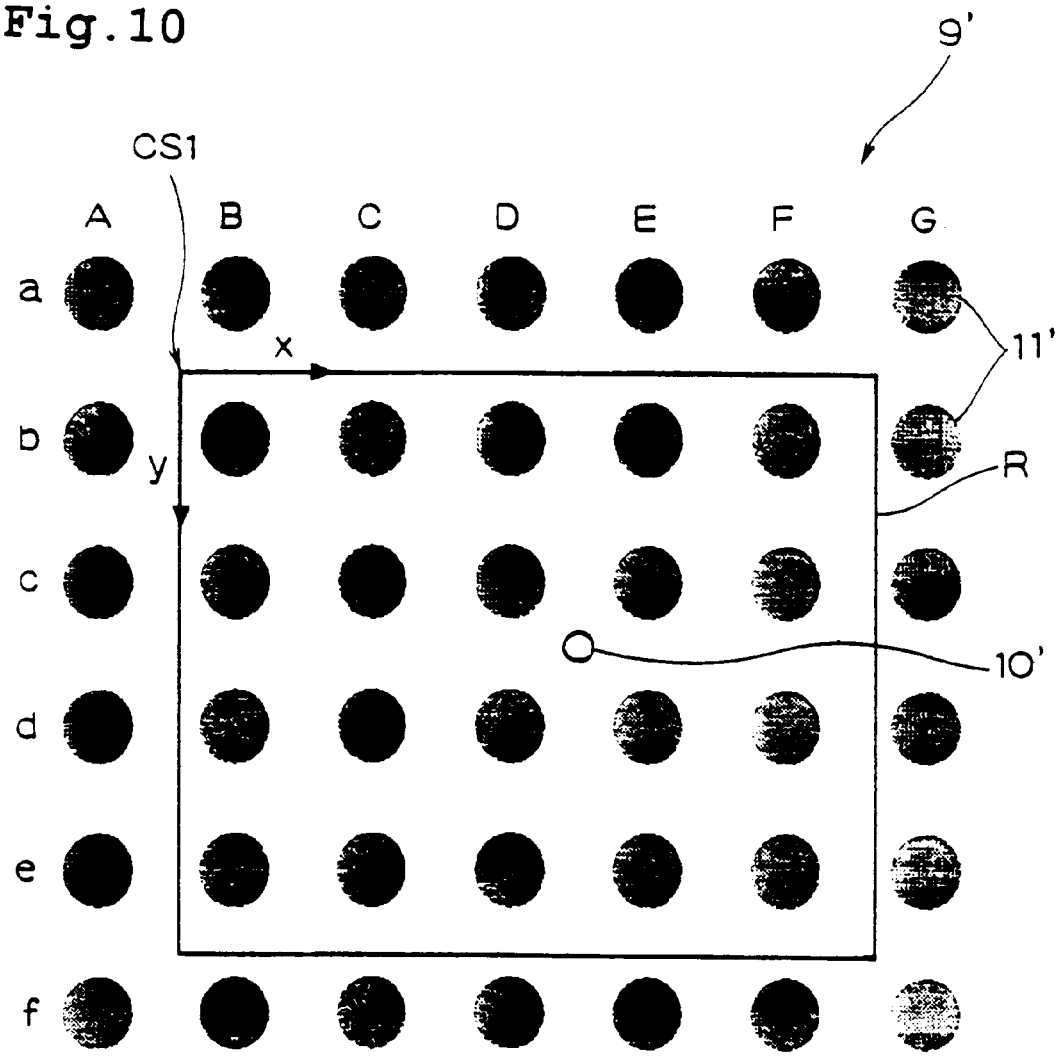
FIG. 10 is a diagram exemplifying a reference picked image and code assignment.

The arm-installed unmanned carriage A2 shown in FIG. 1 comprises an unmanned carriage 1' (one example of a mobile body) on which an arm 2 having a hand 3 at its front end is mounted. Near the lower center portion of the unmanned carriage 1' (where illumination or the like does not affect much) is secured a pickup sensor 4 with a ring-shaped illuminator 5, which faces a floor surface 9' (one example of a predetermined flat surface) An image processor 6' (equivalent to the reference position data acquiring means, on-pause position data acquiring means and code assigning means), a storage section 7' and a teaching data corrector 8' (equivalent to the associating means and deviation calculation means) are further provided in the unmanned carriage 1'. A punching floor with a predetermined pattern of punching holes 11' (equivalent to predetermined pattern components), as shown in FIG. 10, is laid on a floor surface 9'. Further, a identification mark 10' as shown in FIG. 10 is provided on the punching floor 9' at an arbitrary position near the stop position of the unmanned carriage 1'. The identification mark 10' is provided to specify a certain one of the punching holes 11', and suffices if it can specify only one in the picked image due to its properties such as the shape, size and brightness. For example, a mark adhered between the punching holes 11' or a screw hole for fixing the flooring member may be used.

The aforementioned constituting elements will be described more specifically.

An operation for transferring wafers (not shown) from the unmanned carriage 1' to a workbench (not shown) has previously been taught to arm 2 with the unmanned carriage 1' stopped at a predetermined work position. In the actual transfer work, arm 2 works according to this teaching data.

The pickup sensor 4 picks up the image of the punching floor 9' including the identification mark 10' at the time arm 2 is taught the operation and when the unmanned carriage 1' is stopped at a predetermined work position for transfer work.

The image processor 6' performs image processing on the picked image sent from the pickup sensor 4 after image pickup by the pickup sensor 4 to acquire position data of the individual punching holes 11' and the identification mark 10' (the coordinate values on the picked image in the local coordinate system). The positional data obtained at the time of teaching the operation to arm 2 is stored in the storage section 7'.

After the unmanned carriage 1' has stopped at a predetermined work position for transfer work and the image processor 6' has finished its processing, the teaching data corrector 8' associates the position data of the individual punching holes 11', previously stored in the storage section 7', with the position data of the punching holes 11' currently acquired by the image processor 6', in one-to-one correspondence, with respect to the position data of the identification mark, acquiring the amount of deviation of the stop position of the unmanned carriage 1' based on the difference between the associated position data, and correct the teaching data of arm 2 based on the amount of positional deviation.

Figure 9:
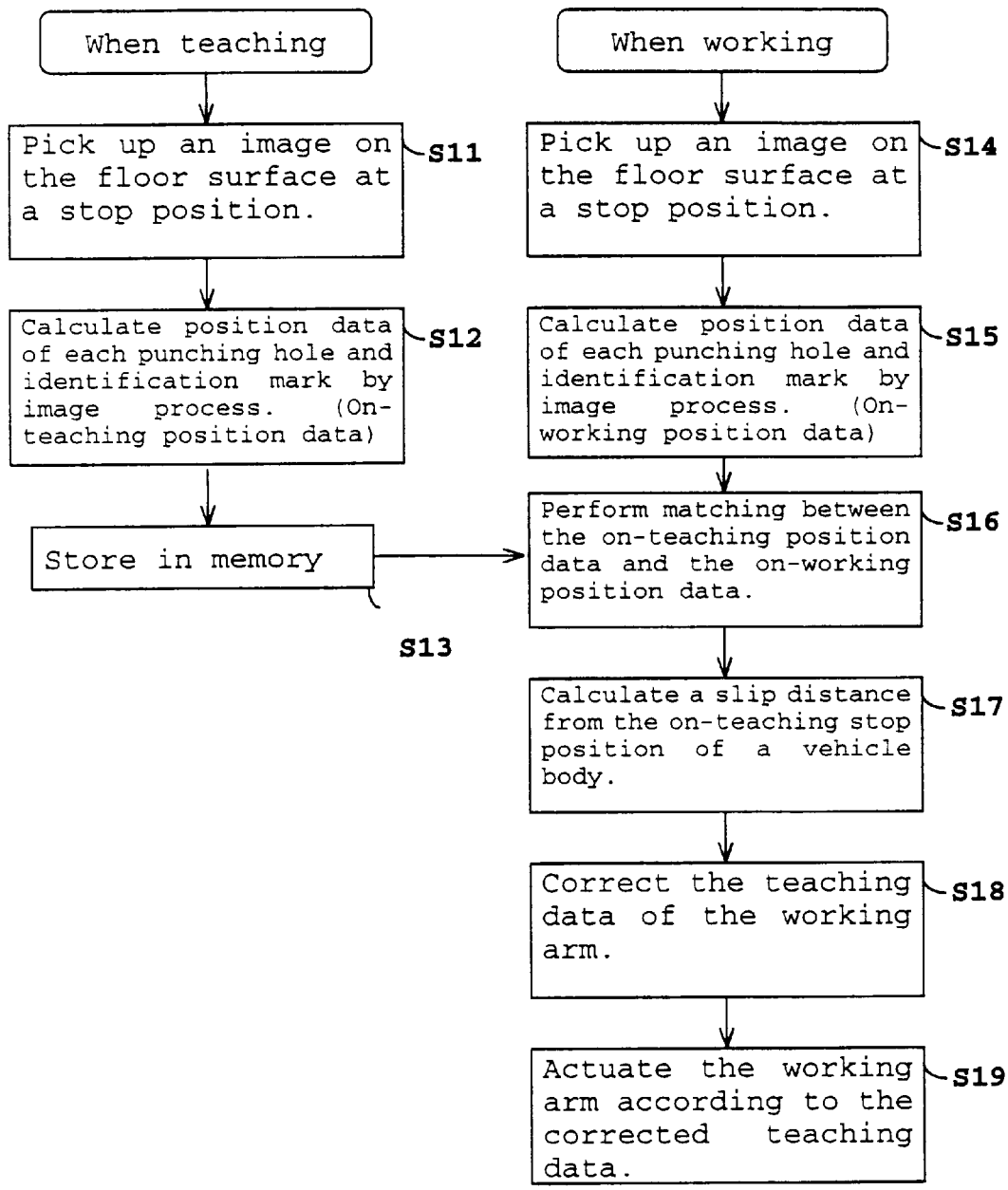
FIG. 9 is a flowchart illustrating procedures of a stop-position deviation detecting process which is carried out by an arm-installed unmanned carriage A2 according to the embodiment 1.

The position correcting operation of the arm-installed unmanned carriage A2 will be described more specifically with reference to the flowchart illustrated in FIG. 9. Prior to the actual transfer work, with the unmanned carriage 1' stopped at a predetermined work position, operation for transferring wafers (not shown) from the unmanned carriage 1' to a workbench (not shown) is taught to arm 2. At this time, the pickup sensor 4 picks up the image of the punching floor 9' (equivalent to the reference picked image) (step S11).

Subsequently, the image processor 6' performs image processing on the picked image (see FIG. 10) given from the pickup sensor 4 to recognize the individual punching holes 11' and the identification mark 10' on the floor surface, and computes the positional coordinates (position data) of the recognized punching holes 11' and identification mark 10' on an image pickup area R in the local coordinate system CS1 (step S12). The position data can be obtained at the optimal positions, such as the center of each punching hole 11', in a work position the shape or the like of the punching holes.

The identification of punching holes 11' and the identification mark 10' and the calculation of their position data can be executed by using template matching or shape properties which are typically used in image processing technology.

The template matching means is to previously store the images of the identification mark 10' and the punching holes 11' as a template image, and extract and recognize a portion in the picked image which has a high relativity with the template image, as shown in FIG. 11. The punching holes 11' in the punching floor used in the embodiment 1 are all formed like circles of the same size. If the image of a single punching hole 11' is used as a template image as shown in FIG. 11, even when the picked image has a rotational angle, the matching process can be performed quickly with a single template image and without rotating the template image and does not require a large memory area which would otherwise be needed to store multiple template images. A possible case where there are several sizes of punching holes 11' can be coped with by preparing template images equal in quantity to those different sizes of punching holes 11'.

The means involving shape properties is to extract and recognize portions with shape properties (see FIG. 12), such as a preset width, height and area, from an image binarized from the picked image with a predetermined threshold value.

While the aforementioned template matching means processes an analog image without digitizing it and thus high precision detection of positions, it suffers a huge amount of computation required in the processing. In this respect, it is effective to combine those two means, such as the shape-property based means being used for portions which do not require high positioning precision, like detection of the identification mark 10', and the template matching means being used for portions which require high precision like detection of the punching holes 11'.

The position data at the teaching time (reference position data) obtained in the aforementioned step S12 is stored in the storage section 7' (step S13).

At the time of the actual work, when the unmanned carriage 1' stops at a predetermined work position, the pickup sensor 4 picks up the image of the punching floor 9' (equivalent to the on-pause picked image; see FIG. 13) (step S14). Then, the image processor 6' performs a process similar to that of the step S12 to acquire the position data at the working time (on-pause position data) (step S15).

Next, the teaching data corrector 8' associates the on-pause position data acquired in the step S15 with the reference position data stored in the storage section 7' in one-to-one correspondence (step S16). This association will now be discussed specifically.

① Based on the coordinate values of the identification mark 10', indexes are affixed to the individual punching holes 11' corresponding to the reference position data. As shown in FIG. 10, for example, codes a, b, c and so forth are given to the individual rows, and codes A, B, C and so forth are given to the individual columns, and indexes prepared by combinations of codes of the associated rows and columns (aA, dB, etc.).

Figure 13:
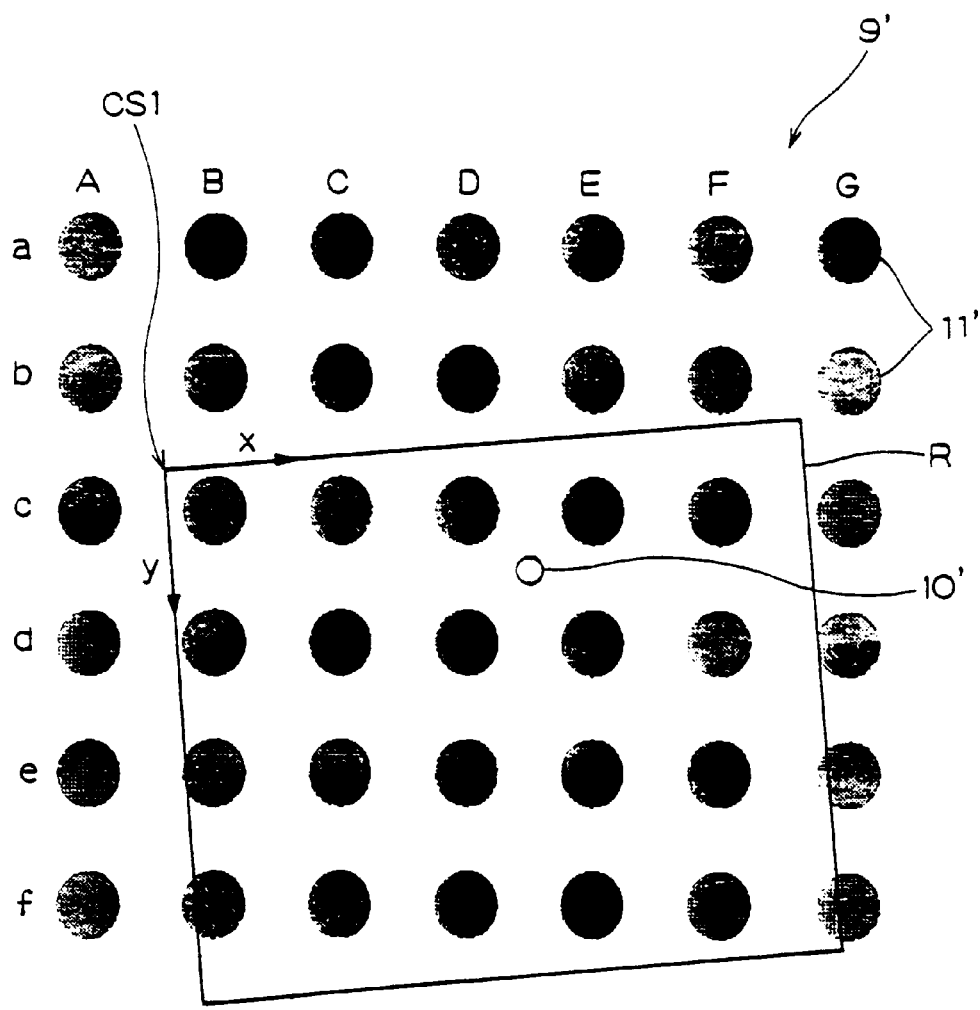
FIG. 13 is a diagram exemplifying a on-pause picked image and code assignment.

② For on-pause position data, indexes are likewise affixed in a manner similar to the one in the procedure ① (see FIG. 13).

③ Those punching holes 11' for the reference position data are associated with those for the on-pause position data with the same indexes.

In the above associating process, the position data of those punching holes 11' which are included only in either the reference position data or the on-pause position data are ignored. That is, the subsequent processing will be executed using only the position data of the punching holes 11' which are included in both the reference position data and the on-pause position data. It is therefore possible to adequately cope with the case where some punching holes 11' cannot be recognized at the working time due to the influence of light disturbance or the like.

FIG. 14 exemplifies the associated individual punching holes 11'. The i-th associated reference position data is expressed as (Tix, Tiy) and the i-th associated on-pause position data as (Pix, Piy). Subsequently, the teaching data corrector 8' acquires a positional and posture deviation between the reference picked image and on-pause picked image, or a deviation of the stop position of the unmanned carriage 1' from a predetermined stop position (reference stop position), using sets of individual position data associated in the step S16 (step S17). Specifically, first, the relationship between the i-th associated reference position data (Tix, Tiy) and on-pause position data (Pix, Piy) is given by $$\begin{pmatrix} Pix \\ Piy \end{pmatrix} = \begin{pmatrix} \cos\theta & -\sin\theta \\ \sin\theta & \cos\theta \end{pmatrix} \begin{pmatrix} Tix \\ Tiy \end{pmatrix} + \begin{pmatrix} dx \\ dy \end{pmatrix} \quad (1)$$

where θ, dx and dy are parameters for conversion from the reference position data to on-pause position data, θ indicating the rotational angle and dx and dy respectively indicating the amounts of parallel displacement in the x and y directions. By computing θ, dx and dy by least squares method using the set of the position data (Tix, Tiy), (Pix, Piy) shown in FIG. 14 in the equation (1), the positional and posture deviation between the reference picked image and the on-pause picked image can be acquired. As the positional and posture deviation can be obtained by using the position data of a plurality of punching holes 11' present in the picked image, high precision measurement is possible. Further, because of the use of the position data of each punching hole 11', production errors, if included in the positions of the punching holes, do not affect the measuring precision.

Next, based on the positional and posture deviation between the reference picked image and the on-pause picked image obtained in the step S17, the teaching data of the arm 2 is corrected (step S18). Arm 2 carries out the transfer work according to the teaching data corrected in step S18 (step S19). Thereafter, every time the unmanned carriage 1' moves, the steps S14 through S19 are repeated.

As explained above, the arm-installed unmanned carriage A2, according to the embodiment 1, acquires position data of the individual punching holes 11', which constitute the pattern formed on the floor surface, from the reference picked image and on-pause picked image, associates the position data of the individual punching holes 11' in the reference position data with their position data in the on-pause position data, and acquires a positional and posture deviation between the reference picked image and the on-pause picked image using the sets of associated position data. As a positional and posture deviation is acquired using multiple sets of position data, high precision measurement is possible. Further, due to the use of the position data of each punching hole 11', productional errors, if included in the positions of the punching holes, do not affect the measuring precision. Furthermore, because of the use of multiple sets of position data to acquire a positional and posture deviation, it is possible to adequately cope with the case where some punching holes 11' cannot be recognized at the working time due to the influence of light disturbance or the like, by disregarding the position data of the punching holes 11' which are included only in either the reference position data or the on-pause position data and using only the position data of the punching holes 11' which are included in both the reference position data and the on-pause position data.

(a)

In the position correcting operation by the arm-installed unmanned carriage A2 according to the embodiment 1, the detection precision δ for the position data of the individual punching holes at the teaching time and working time and the number of sets, n, of the associated position data become significant factors to determine the precision. The greater this "n" is, the higher the precision becomes, but setting the number too large would undesirably increase the processing time in the associating process (the step S16) and the computation of the amount of a positional and posture deviation (the step S17) and increase the memory capacity needed for those processes. If, after computing on-pause position data (the step S15), a proper number of pieces of position data are selected from the acquired position data to limit the number of position data to be used in the subsequent processing to the proper number, increases in processing time and memory to be used can be suppressed while maintaining high precision. In this case, the number of data after selection can be computed from an error allowed in the calculation of the positional and posture deviation (the step S17). It has been confirmed statistically and experimentally that the computation error Δ for the positional and posture deviation roughly becomes:

$$\Delta = \delta/n \quad (2)$$

With Δm denoting the maximum allowable value for Δ and n' indicating the number of selected data, therefore, n' can be obtained from the following equation.

$$n' > (\delta/\Delta m)^2 \quad (3)$$

While the n' pieces of position data may be selected at random from the position data computed in the step S15, it is more effective if position data suitable for computation of a the positional and posture deviation (the step S17) is extracted with priority over the other. For example, if priority is given to the selection of data around the image pickup area P (see FIG. 13), the precision for the posture angle θ is improved.

(b)

Figure 15:
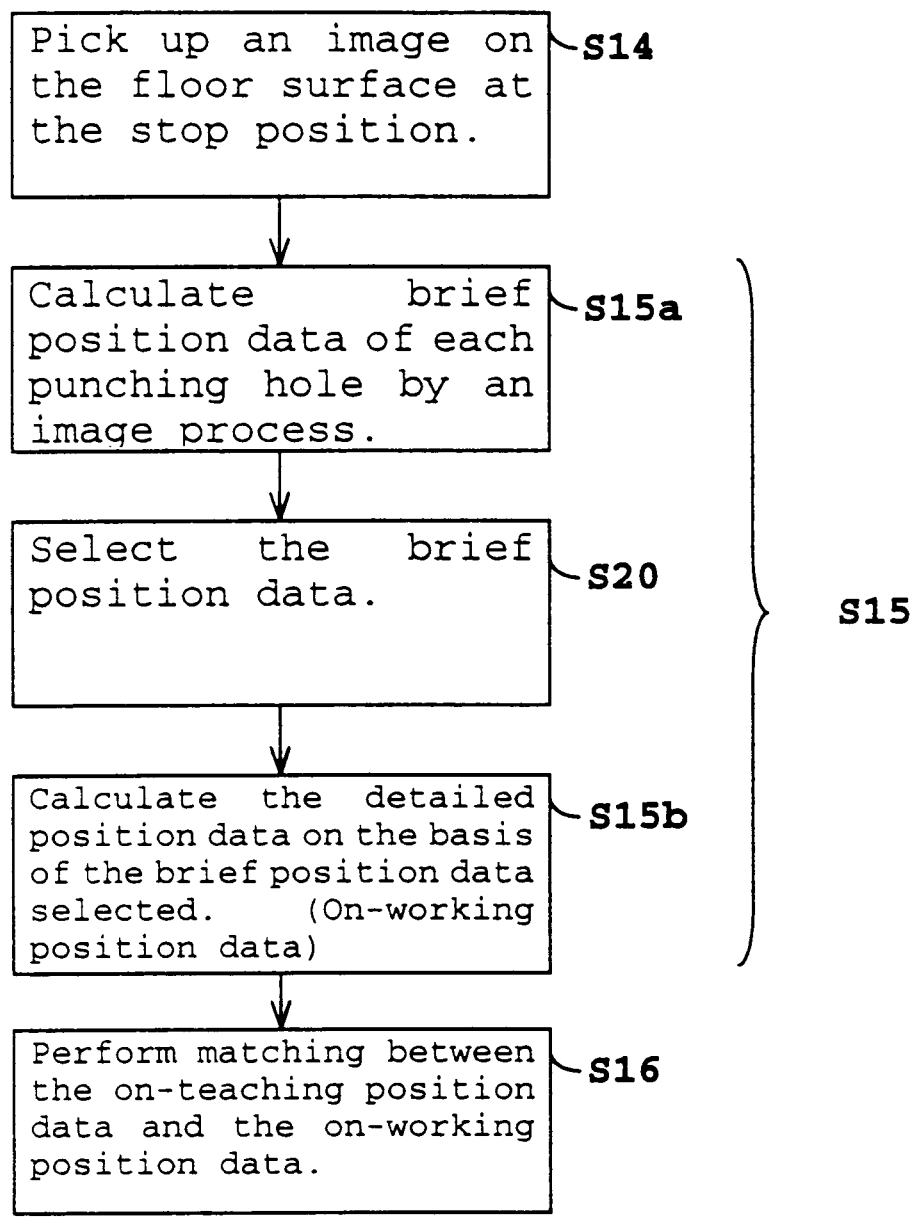
FIG. 15 is a flowchart illustrating procedures of a process in step S5 according to the embodiment 1 (b)

Although proper position data is selected after computing on-pause position data (the step S15) in the above case (a), the effect of reducing the processing time and the memory in use can be increased if the process of selecting position data is executed in the process of the step S15. For example, the process of the step S15 is separated into a process of roughly computing position data and a process of computing detailed position data, and the data selecting process is carried out between those two. This modification will now be discussed specifically using the flowchart shown in FIG. 15.

After the image of the floor surface is picked up in step S14, image data is reduced by performing a thinning or averaging process on the picked image first, the individual punching holes 11' are recognized from the reduced image data, and then rough position data is calculated (step S15a). If the number of vertical and horizontal pixels of an image is reduced to 1/m in the reduction process, the processing time can greatly reduced to nearly $1/m^4$ (in the case of template matching), or $1/m^2$ (in the case of using shape properties). Then, the selection of position data as described in the case (a) is performed (step S20), and detailed data for the vicinity of the punching holes 11' corresponding to the selected position data is computed by using image data which has not undergone the reduction process (step S15b).

The above processes can further suppress increases in processing time and memory in use while maintaining high precision.

(c)

Figure 16:
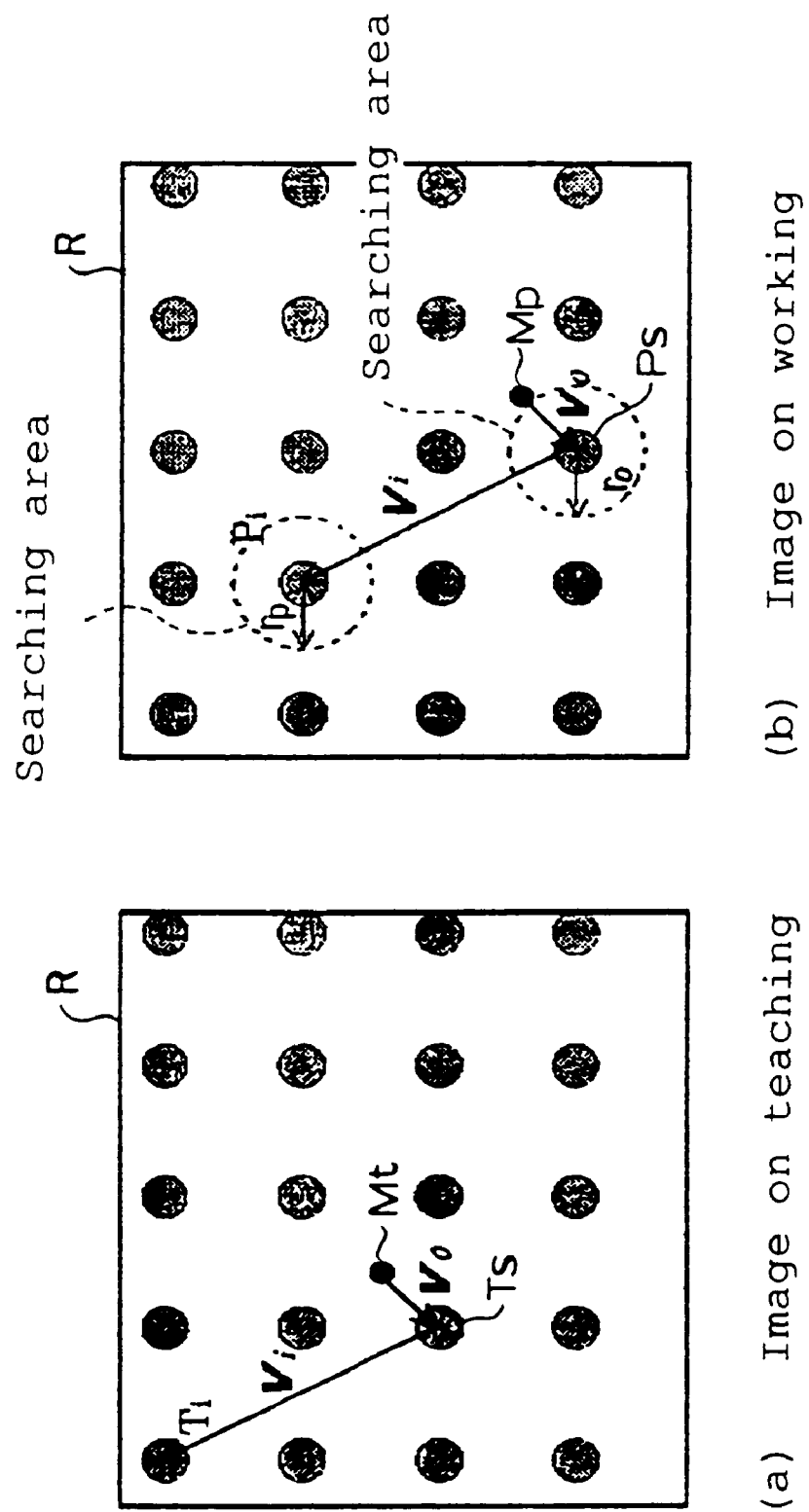
FIG. 16 is an explanatory diagram for matching process in the case where punching holes do not have a regular pattern according to the embodiment 1 (c)

In the embodiment 1, with respect to a matching process of step S12, indexes are affixed to the individual punching holes 11' based on the coordinate values of the identification mark 10' and those punching holes 11' with the same indexes between the teaching time and the working time are associated with one another in the association process in step S12. This scheme is however applicable only to the case where the punching holes 11' are arranged regularly in the vertical and horizontal directions Referring to FIG. 16, a description will thus be given of procedures of an association process which is applicable to the case where the arrangement of the punching holes 11' does not have regularity.

①  Position data (reference position data) of the individual punching holes 11' at the teaching time are rearranged in the order of from the closest to a identification mark Mt toward the farthest (see FIG. 16(a)).

② With regard to the reference position data, the position data of the punching hole 11' that is closest to the identification mark Mt is selected as the start point Ts.

③ Let the vector from the identification mark Mt to the start point Ts be V0.

④ With regard to on-pause position data (FIG. 16(b)), position data located near the position extending from a identification mark Mp by the vector V0 is sought out to be a start point Ps. At this time, the search range is set to have a radius of r0 and when there is one piece of position data within this range, it becomes the start point Ps. If there is no corresponding position data within the search range, the flow returns to the process ② after which the processes ③ and ④ are performed with the next closest position data taken as a new start point Ts. This process is repeated until the start point Ps is determined.

⑤ For the reference position data, let the vector from the start point Ts to another position data Ti be Vi (see FIG. 16(a)).

⑥ With regard to on-pause position data (FIG. 16(b)), position data Pi corresponding to Ti is sought out near the position extending from the start point Ps by the vector Vi in the search range of a radius rp. If Pi is found, the position data Ti is associated with the position data Pi. This process is repeated for every Ti.

The above-described processing can be used when a deviation in posture angle included in a positional and posture deviation between the punching floor and the unmanned carriage at the teaching time and the working time is small. When the posture angle deviation is large, a rough posture angle deviation is calculated from the angular deviation between the vector V0 in the process ③ and a vector MpPs determined in the process ④, and the process ⑥ can be executed based on the rough posture angle deviation.

The above-described associating process can cope with the case where the punching holes 11' are arranged irregularly in the vertical and horizontal directions.

(d)

Figure 17:
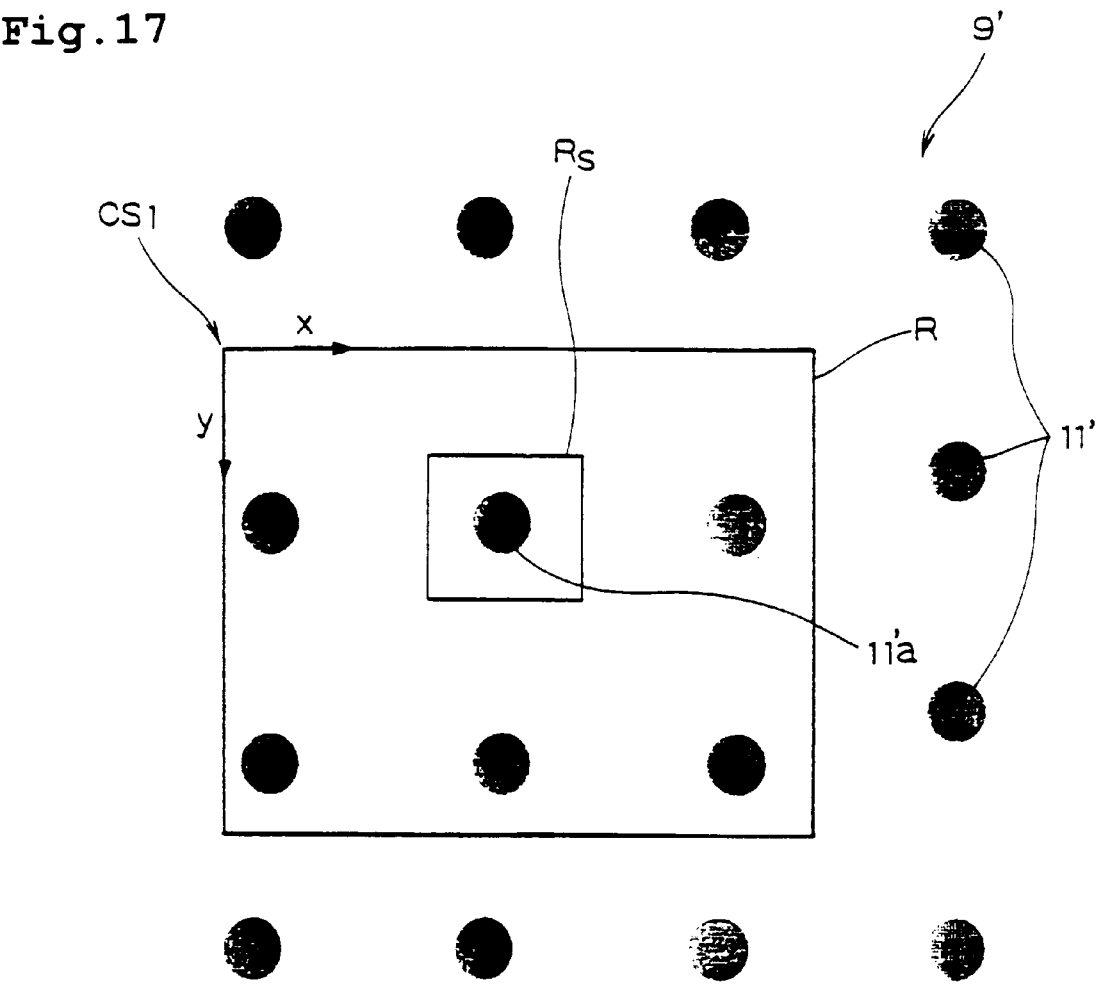
FIG. 17 is an explanatory diagram in the case where a specific punching hole is used as a identification mark according to the embodiment 1 (d)

Although the identification mark 10 provided as separate from the punching holes 11' on the floor surface is used in the embodiment 1, if there is any punching hole 11' which can be specified on a picked image is usable as the identification mark. An example shown in FIG. 17 has the punching holes 11' arranged at wide intervals in the image pickup area R and can thus guarantee that a single specific punching hole 11'a is always present in a range Rs of a stop error of the unmanned carriage 1'. This punching hole 11'a can thus be used as the working machine identification mark.

Although the foregoing description of this example has been given with reference to the case where the unmanned carriage (mobile body) runs on the floor surface (flat surface) on which some pattern and a identification mark are formed, the mobile body and the flat surface are not limited to an unmanned carriage and a floor surface. For example, this embodiment may be adapted to the case where positioning is carried out with a pattern and a identification mark formed on a workbench (flat surface) and a camera attached to the front end (mobile body) of a robot arm which moves on the workbench, or the case where a working machine is positioned to work which is to be handled by the working machine, using a pattern and a identification mark formed on the work itself.

Embodiment 2

The positional position correcting apparatuses of the above-described embodiment and the embodiment 1 may not be able to clearly pick up the identification mark 10 (10') depending on the stop position of the body 1 (1') at the time of picking up the floor surface, due to disturbance like external illumination. If the identification mark 10 (10') and the punching holes 11 (11') around it are picked up with similar brightness, discrimination may become inaccurate or take time.

Figure 29:
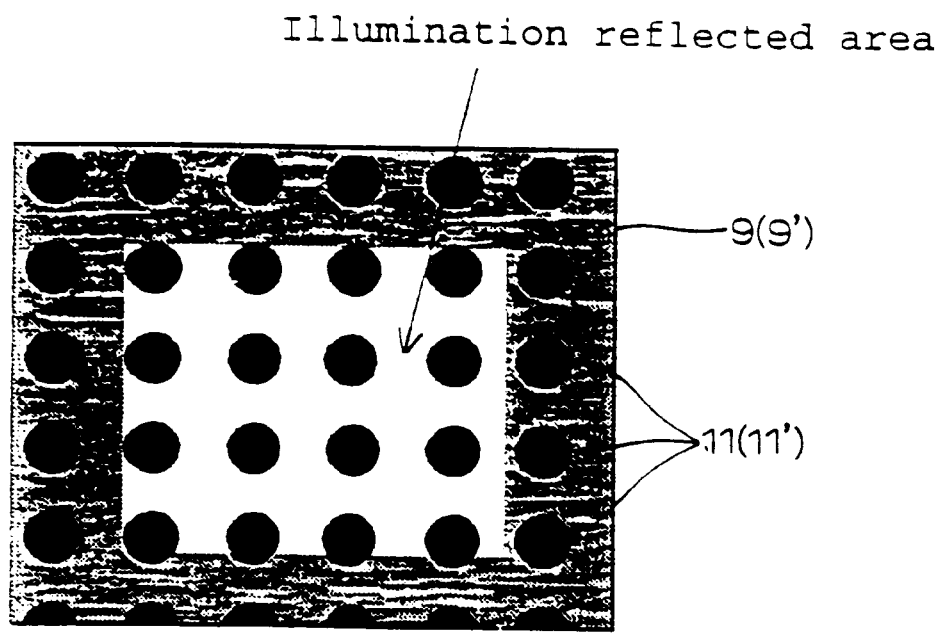
FIG. 29 is a diagram exemplifying the image of a floor surface picked up by a pickup sensor 4.

If the floor surface 9 (9') is mirror-finished, for example, the light from the illuminator 5 (see FIG. 1) does not scatter on the floor surface 9 (9') and comes directly into the pickup sensor 4 by regular reflection. Therefore, the picked image of the illuminated portion may have a different brightness from that of the picked image of the other portion as shown in FIG. 29, which will interfere with the accurate measurement of the position data of the individual punching holes 11 (11').

Figure 18:
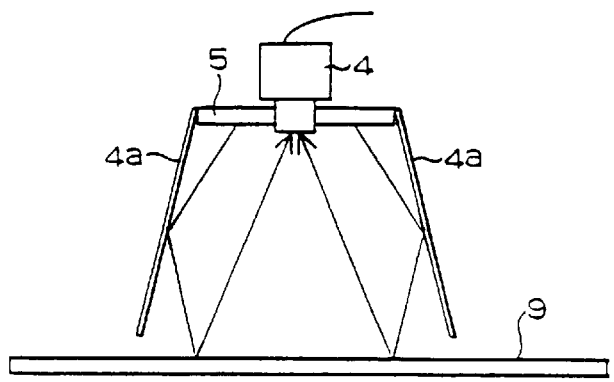
FIG. 18 is an exemplary diagram showing one example of reflection of light from an illuminator 40 when a reflector 2 is attached to a pickup sensor 4.

In this respect, a reflector 4a is so provided as to surround the field of view of the pickup sensor 4, as shown in FIG. 18, so that the light emitted from the illuminator 5 is condensed on the floor surface 9 within the field of view of the pickup sensor 4. Accordingly, the light regularly reflected at the floor surface even at the peripheral portion other than the illuminated area directly below the illuminator 5 is allowed to enter the pickup sensor 4, thus ensuring uniform brightness over the individual portions of the picked image. This feature can guarantee more accurate and easier image processing using picked images, for example, a process of measuring position data of the individual punching holes 11.

Furthermore, by giving a process optically different from a pattern on the floor surface to the above-mentioned identification mark 10, the identification mark can be easily detected from the pickup image.

Figure 19:
FIG. 19 is an exemplary diagram showing one example of an identification mark 10 which has a mirror-finished spherical surface.

If the identification mark 10 is mirror-finished as shown in FIG. 19, it increases reflection of light from the illuminator 5 and provides a different brightness from that of the punching holes 11 on the floor surface, so that the identification mark 10 in the picked image can be detected more easily. The mirror-finished surface may further be made into a spherical surface, in which case even when the position of the identification mark is off the area directly below the pickup sensor 4 or the illuminator 5, intense reflection of light from the illuminator 5 surely appears on the spherical surface. This always ensures clear image pickup by the pickup sensor 4. The spherical surface of the identification mark should not necessarily be convex, but may be concave.

Figure 20:
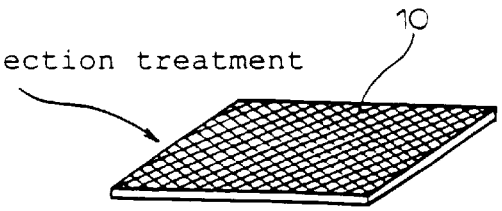
FIG. 20 is an exemplary diagram showing another example of the identification mark 10 whose surface has undergone black-color irregular reflection treatment.
Figure 21:
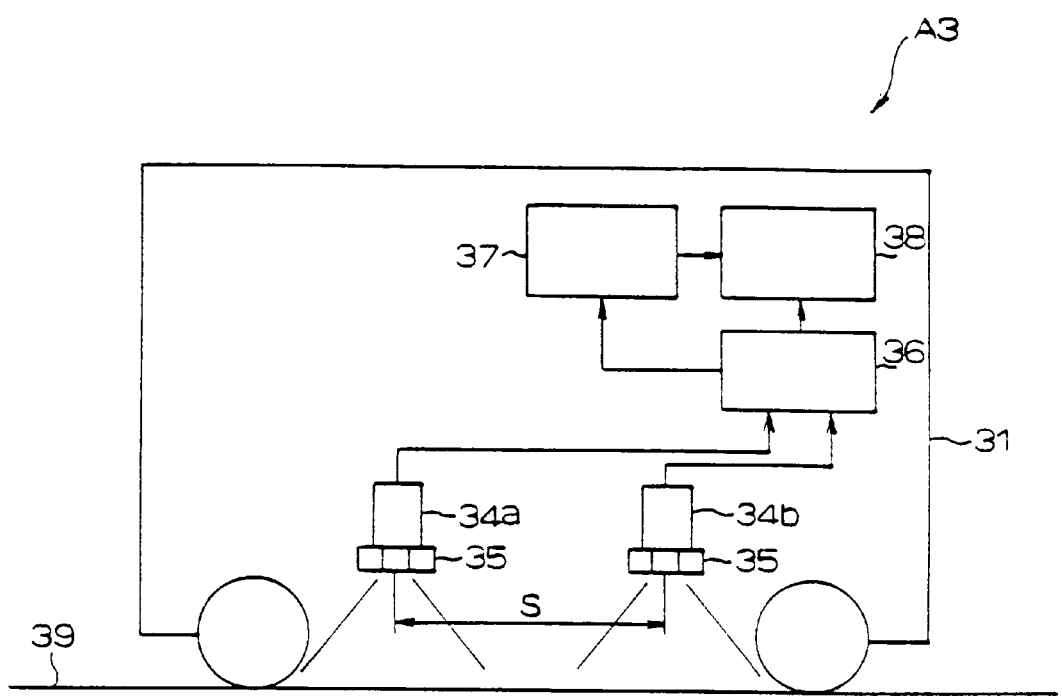
FIG. 21 is an exemplary diagram illustrating the schematic structures of a stop-position deviation detecting apparatus A3 according to embodiment 3 and an unmanned carriage 31 on which the apparatus is mounted.

Alternatively, the surface of the identification mark 10 may be colored blackish enough to scatter light as shown in FIG. 20, for example. As a result, reflection of light from the illuminator 5 toward the pickup sensor 4 becomes less on that surface than the area around it, it clearly distinguishes the identification mark 10 from the punching holes 11 on the picked image.

Embodiment 3

It is considered how the precision of the amount of positional deviation that is detected in the above-described embodiment, and the embodiment 1 affects precision of the position of, for example, the hand 3 (see FIG. 1) at the front end of the arm 2.

First, an error in the detected amount of positional deviation in the parallel direction is directly reflected on the position of the hand 3 in the parallel direction, regardless of where the hand 3 is positioned. For example, assuming that an error in the detected amount of positional deviation in the parallel direction is ($\delta x$, $\delta y$), the position of the hand 3 after correcting the teaching data based on that amount of positional deviation is also shifted from the original taught position by ($\delta x$, $\delta y$). However, the farther away the position of the hand 3 comes from the rotational center, the more an error in the detected amount of positional deviation in the rotational direction affects the precision of the position of the hand 3. If the rotational error in the detected amount of positional deviation is $\delta \theta$, a positional deviation of $\delta \theta \cdot L$ is produced at the position apart from the rotational center by the distance L. In other words, even if the influence of a rotational error in the detected amount of positional deviation in the field of view of the pickup sensor 4 falls within an allowance, this influence of the rotational error may become too large to be negligible at the position of the hand 3 where the distance L is large.

This shortcoming results from the fact that detection of the amount of positional deviation is performed based on information in a limited range like the field of view of the pickup sensor 4. That is, as long as the amount of positional deviation is detected based only on information in such a limited range, there is a certain limit to suppress the influence of the rotational error. As a simple solution, the field of view of the pickup sensor 4 may be widened. This solution requires the use of a pickup sensor with a wider field of view (image pickup area) and high detection precision, which is not cost effective.

In view of the above, a stop-position deviation detecting device capable of improving, particularly, the rotational precision of the amount of positional deviation without using a pickup sensor with a wider field of view is proposed as the embodiment 3.

The stop-position deviation detecting device A3 according to the embodiment 3, mounted on an unmanned carriage 31, comprises two pickup sensors 34a and 34b attached to the lower portion of the unmanned carriage 31 (where it is less likely to be affected by illumination or the like), facing a floor surface 39, an image processor 36, a storage section 37 and a positional deviation detector 38. Identifiable marks $\alpha$-1 to $\alpha$-n and $\beta$-1 to $\beta$-n are provided on the floor surface 39.

The two pickup sensors 34a and 34b are arranged at the same position across the unmanned carriage 31 and apart from each other by a distance S along the unmanned carriage 31, and are each equipped with a ring-shaped illuminator 35. At the time of teaching the reference position and when the unmanned carriage 31 is stopped to do transfer work, the pickup sensors 34a and 34b pick up the image of the floor surface 39 including the aforementioned marks.

The image processor 36 performs image processing on the picked images picked up by, and supplied from, the pickup sensors 34a and 34b to acquire position data of the individual marks (the coordinate values in the local coordinate system set for the picked images). The position data obtained at the time of teaching the reference position to the unmanned carriage 31 is stored in the storage section 37.

At the positional deviation detector 38, after the unmanned carriage 31 has stopped at the time of performing a transfer work and the image processor 36 has finished its processing, the amount of deviation of the stop position of the unmanned carriage 31 is acquired by least squares method or the like based on the difference between the position data of the individual marks previously stored in the storage section 37 and the position data of the marks currently obtained by the image processor 36.

The image processor 36, the storage section 37 and the positional deviation detector 38 constitute the deviation amount detecting means.

Figure 22:
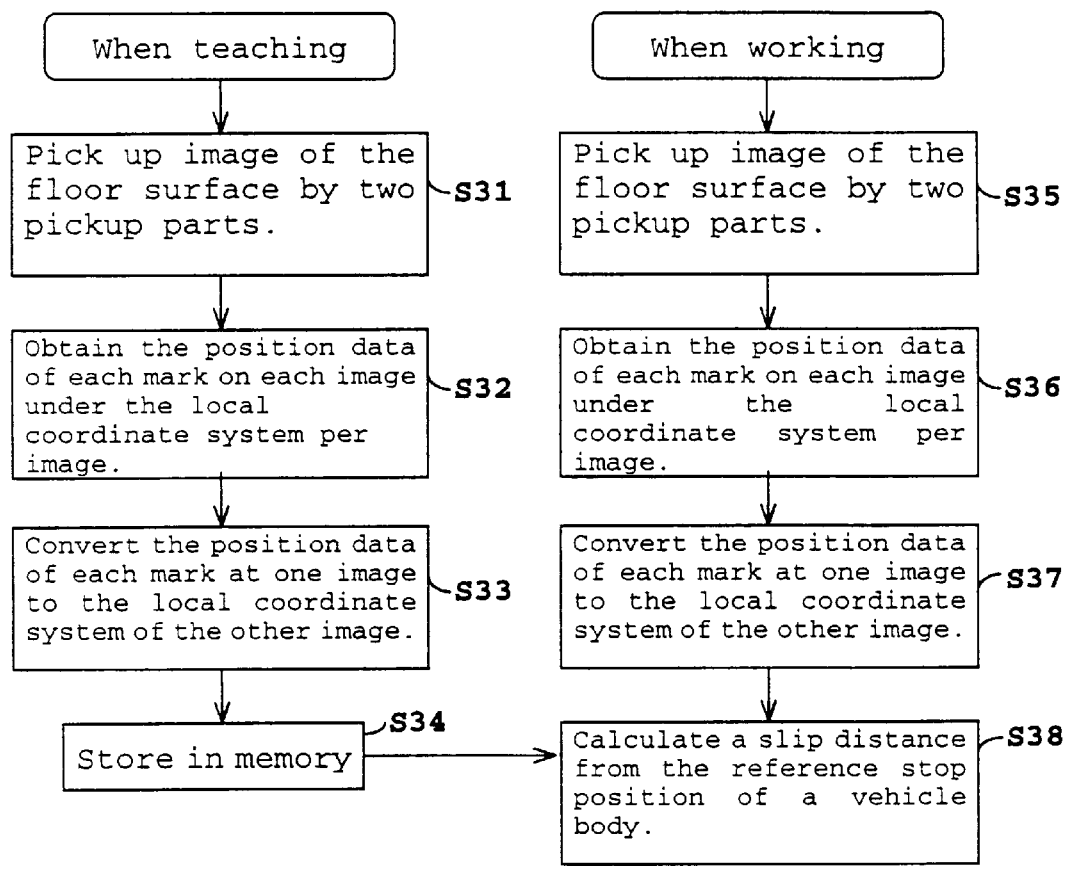
FIG. 22 is a flowchart illustrating a sequence of procedures which are executed by the stop-position deviation detecting apparatus A3.
Figure 23:
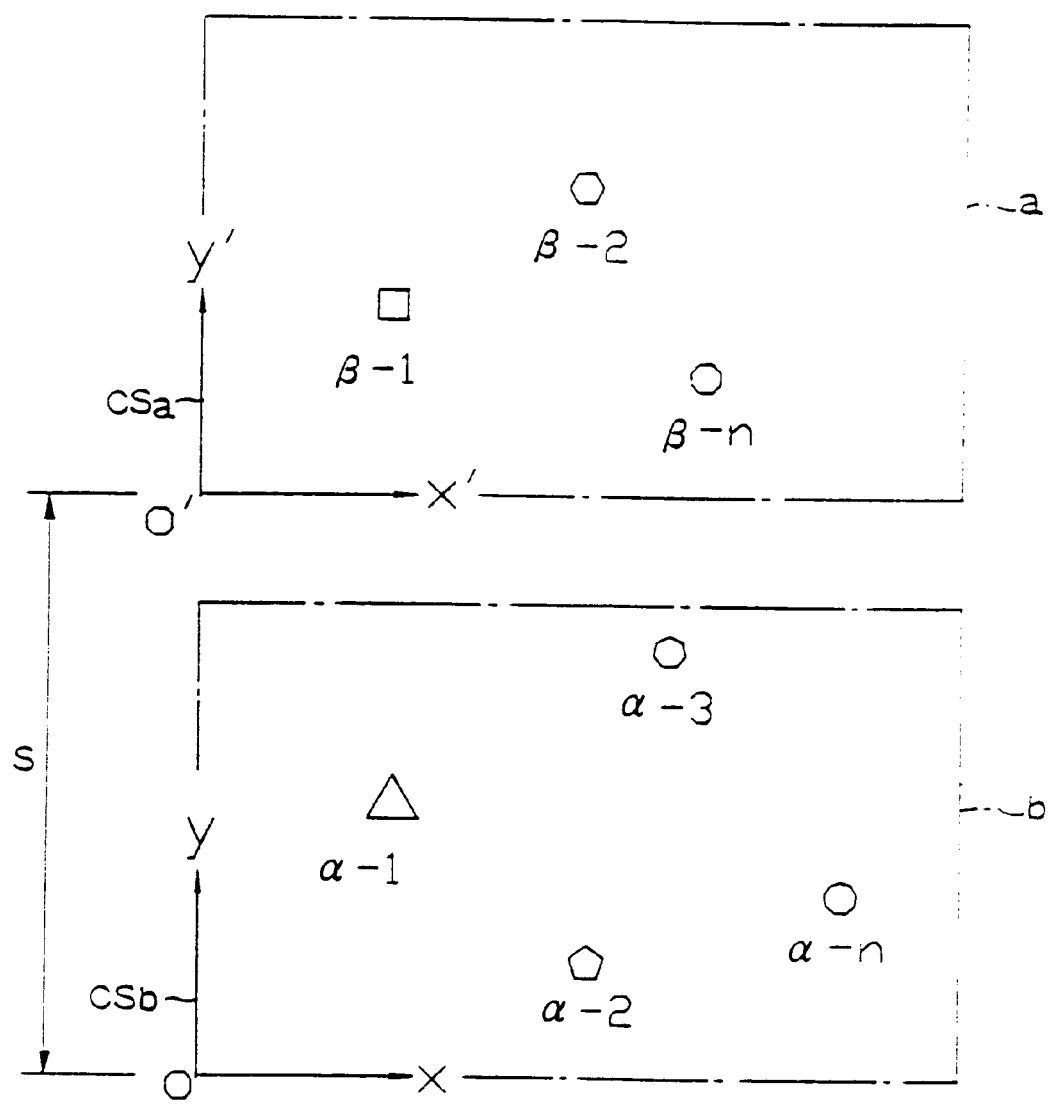
FIG. 23 is an explanatory diagram showing images picked up by two pickup sensors 34a and 34b and the positional relationship or the like between those images.

The positional-deviation-amount detecting operation of the unmanned carriage 31 in the stop-position deviation detecting device A3 will be described more specifically with reference to the flowchart illustrated in FIG. 22 and FIG. 23.

Prior to the actual transfer work, the reference stop position is taught in the following procedures.

First, with the unmanned carriage 31 stopped at a predetermined reference stop position, the pickup sensors 34a and 34b pick up the image of the floor surface 39 (equivalent to the reference picked image) (step S31). FIG. 23 exemplifies picked images a and b respectively picked up by the pickup sensors 34a and 34b. The pickup sensor 34a picks up the marks β-1 to β-n and the pickup sensor 34b picks up the marks α-1 to α-n.

Subsequently, the image processor 36 performs image processing on the picked images (see FIG. 23) from the pickup sensors 34a and 34b to recognize the individual marks and computes the coordinate values (position data) of each recognized in the local coordinate system set for the picked image (step S32). In the example in FIG. 23, position data of the marks β-1 to β-n in the picked image is acquired in the local coordinate system CSa, and position data of the marks α-1 to α-n in the picked image b is acquired in the local coordinate system CSb. The position data can be obtained at the optimal positions, such as the center of each mark, according to the shape or the like of the marks. The identification of the marks and the calculation of their position data can be carried out by using template matching or shape-property based assigning means (already discussed in "Embodiment 1") which are typically used in image processing.

Next, the position data of all the marks are converted to position data of the common coordinate system (step S33). For example, the position data of each mark on one picked image is converted to coordinate values in the local coordinate system set for the other picked image. Wherein, the position data of the marks β-1 to β-n obtained under the local coordinate system CSa are converted to position data in the local coordinate system CSb. Because the origins in the local coordinate systems CSa and CSb are positioned apart from each other by the distance S in the direction of the y-axis due to the positional relation between the two pickup sensors 34a and 34b, as shown in FIG. 23, S should be added to the value of the y coordinate of every position data of the marks β-1 to β-n. Even if the two local coordinate systems are shifted from each other also in the x direction or are in a rotational relationship with each other, conversion should be performed using the proper conversion matrix. Through the above-described process, the position data of each mark picked up by the two pickup sensors 34a and 34b becomes identical to those picked up by a single pickup sensor with a wider field of view.

The position data acquired in the step S33 is stored in the storage section 37 (step S34).

Next, in the actual transfer work, when the unmanned carriage 31 stops, exactly the same processes as the aforementioned steps S31 to S33 are performed at the stop position (steps S35 to S37).

The positional deviation detector 38 acquires the amount of positional deviation of the body 31 based on the difference between the position data of each mark at the reference stop position, stored in the storage section 37, and the position data of each mark at the current stop position acquiring in the step S37 (step S38). Specifically, the amount of positional deviation is acquired by computing θ, dx and dy by substituting a set of reference position data (Tix, Tiy) at the teaching time and position data of on-pause position data (Pix, Piy) at the working time, with respect to the same mark, into the equation (1) (see "Embodiment 1") and using least squares method.

As explained above, the stop-position deviation detecting device A3 according to the embodiment 3 converts position data of each mark in the images picked up respectively by the two pickup sensors 34a and 34b, installed with a predetermined positional relationship, into position data of the common coordinate system based on the predetermined positional relationship, and then detects the amount of positional deviation of the body based on that position data. This apparatus A3 can thus detect the amount of positional deviation of the body by using a positional deviation of marks on the picked image, set farther apart from each other, as in the case of using image pickup means with a wider field of view which includes the image pickup area of the two pickup sensors. Further, the precision of image identification is not lowered. It is therefore possible to enhance the rotational precision of the amount of positional deviation without using any pickup sensor with a wider field of view.

While this example uses two pickup sensors, three or more pickup sensors may of course be arranged.

When the floor surface has a pattern made of a punching member or the like, the precision in detecting the amount of positional deviation can be further improved by executing the same processing as done by the positional deviation detecting device A2 according to the embodiment 1 in the process by each pickup sensor and the process following the conversion of position data to position data of the common coordinate system.

Needless to say, this embodiment 3 is not limited to the above-described embodiments and case where a identification mark is used as a reference as the embodiments 1 and 2.

Embodiment 4

Figure 30:
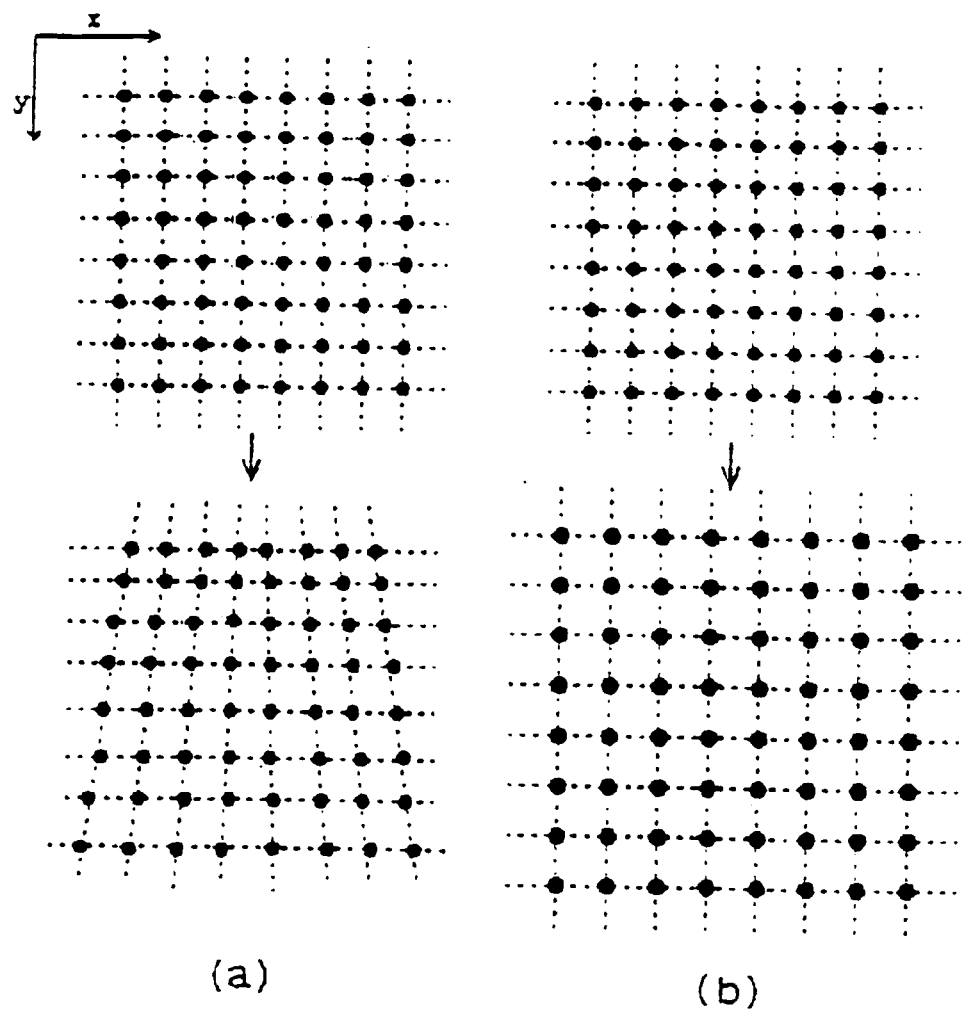
FIG. 30 is a diagram showing the relationship between a reference picked image (above) and an on-pause picked image (below) in case (a) where a mobile body stops with its body tilted and case (b) where the height position of the pickup sensor is changed.

The above-described positional deviation detecting means detects the amount of a two-dimensional positional deviation (the deviations dx and dy in the parallel direction, the rotational deviation dθ). In the case where the positional relationship between the body 1 (and the pickup sensor 4) and the floor surface 9 three-dimensionally varies between the teaching time and the working time, like when a wheel falls into a punching hole 11, tilting the body, or the height position of the pickup sensor 4 from the floor surface 9 varies due to wearing of the wheels, therefore, this means cannot accurately detect the amount of positional deviation. For example, the relation between a reference picked image and an on-pause picked image when the body stops tilted becomes as illustrated in FIG. 30(a) (above is the reference picked image and below is the on-pause picked image), and the relation between a reference picked image and an on-pause picked image when the height position of the pickup sensor 4 changes becomes as illustrated in FIG. 30(b) (above is the reference picked image and below is the on-pause picked image). In either case, the means according to the above-described embodiment and the embodiments 1 to 3 cannot accurately obtain the amount of positional deviation.

In this respect, a stop-position deviation detecting device for a mobile body, which can accurately detect the amount of positional deviation even when the positional relationship to the floor surface between the teaching time and the working time varies three-dimensionally, is proposed as the embodiment 4.

Figure 24:
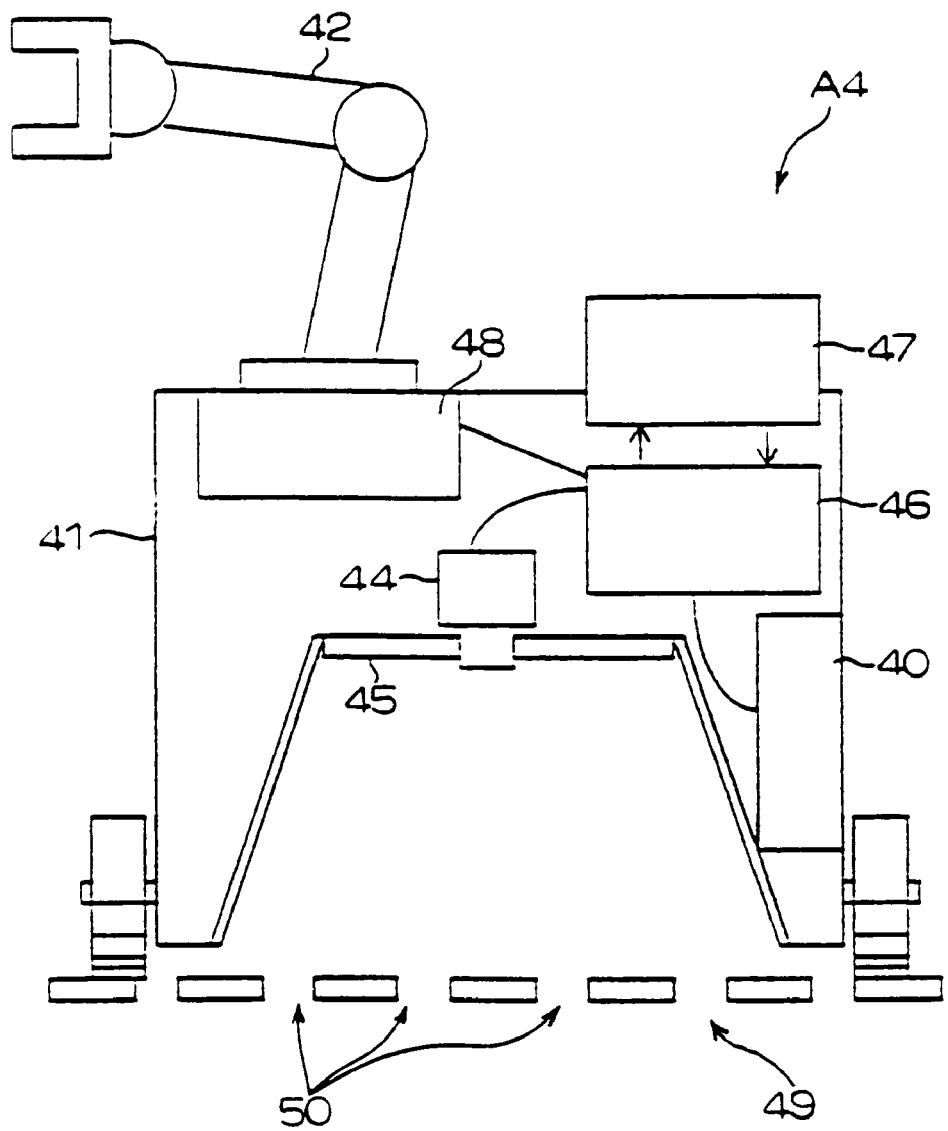
FIG. 24 is an exemplary diagram illustrating the schematic structures of a stop-position deviation detecting apparatus A4 according to embodiment 4 and an unmanned carriage 41 on which the apparatus is mounted.
Figure 25:
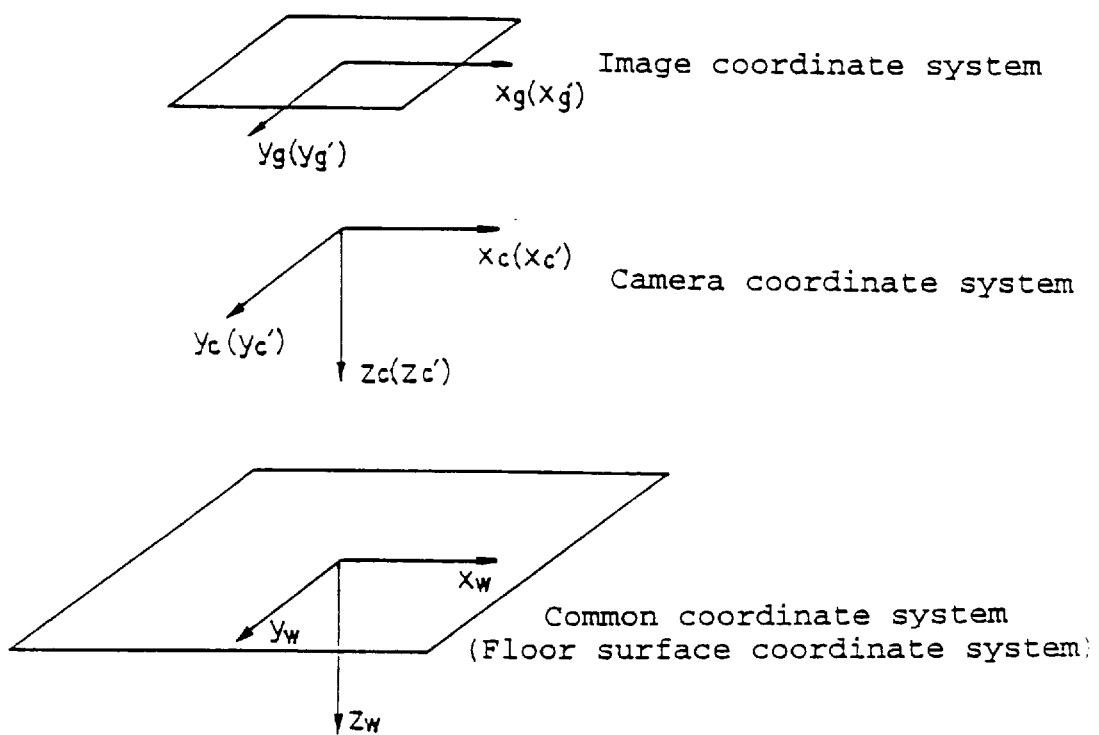
FIG. 25 is an explanatory diagram showing the relationship among a world coordinate system, a camera coordinate system and an image coordinate system.

A stop-position deviation detecting device A4 according to the embodiment 4 is mounted on an unmanned carriage 41. As shown in FIG. 24, an arm 42 for transferring works is installed on the unmanned carriage 41, and a pickup sensor 44 with a ring-shaped illuminator 45, is securely installed near the lower center portion of the unmanned carriage 41 (which is less likely to be affected by illumination or the like), facing a floor surface 49. A calculation device 46, a storage section 47, a body controller 40 and an arm controller 48 are further provided in the unmanned carriage 41. Punching holes 50 are formed in the floor surface 49 in a predetermined pattern, as typically done in a semiconductor clean room or the like.

The positional deviation detecting operation by this stop-position deviation detecting device A4 will be discussed briefly.

An operation for transferring wafers (not shown) from the unmanned carriage 41 to a workbench (not shown) has previously been taught to arm 42 with the unmanned carriage 41 stopped at a predetermined reference stop position. In the actual transfer work, the arm 42 works according to that teaching data.

The pickup sensor 44 picks up the image of the punching floor 49 at the time the operation is taught to arm 42 (hereinafter called teaching time) and when the unmanned carriage 41 stops at for transfer work.

The above calculation device 46 performs image processing on the picked image picked up and sent from the pickup sensor 44 to acquire position data of the individual punching holes 50 (the two-dimensional coordinate values in the local coordinate system set for the picked image). It is desirable to use the center position of each punching hole 50 as the position at which the position data should be obtained. This occurs, for example, even when the body tilts to provide a picked image as shown in the lower half of FIG. 30($a$) so that each punching hole 50 becomes elliptical on the image, the center position can accurately specify regardless of the elliptical shape. The positional data obtained at the teaching time (hereinafter called reference position data) is stored in the storage section 47.

The above calculation device 46 acquires position data of each punching hole 50 of the working time from on-pause picked image obtained then (hereinafter called on-pause position data), then associates the on-pause position data with the reference position data, previously stored in the storage section 47, in one-to-one correspondence, and acquires the amounts of three-dimensional deviation of the stop position of the unmanned carriage 41 (dx, dy, dz, d$\theta$, d$\phi$, d$\psi$) based on the associated position data. One way to implement the association is to provide a mark which is off the layout pattern of the punching holes 50 and use the mark in the process (see "Embodiment 1"). The obtained amounts of three-dimensional positional deviation are sent to the body controller 40 to correct the stop position of the body, or are sent to the arm controller 48 to correct the teaching data of the arm.

Now, a means of calculating the amounts of three-dimensional positional deviation that is carried out by the calculation device 46 will be described in detail. In the following description, the coordinates in the world coordinate system set on the floor surface 49 (hereinafter called world coordinates) are expressed by $X_w$ ($x_w$, $y_w$, $z_w$), the coordinates in the camera coordinate system set in the pickup sensor 44 (hereinafter called camera coordinates) are expressed by $X_c$ ($x_c$, $y_c$, $z_c$), and the coordinates in the image coordinate system set in the picked image picked up by the pickup sensor 44 (hereinafter called image coordinates) are expressed by $X_g$ ($x_g$, $y_g$, $z_g$).

To begin with, the coordinate conversion from the world coordinates to the camera coordinates is expressed by the following equation.

$$X_c = RX_w + T$$

$$\begin{pmatrix} X_c \\ y_c \\ z_c \end{pmatrix} = \begin{pmatrix} r_{11} & r_{12} & r_{13} \\ r_{21} & r_{22} & r_{23} \\ r_{31} & r_{32} & r_{33} \end{pmatrix} \begin{pmatrix} x_w \\ y_w \\ z_w \end{pmatrix} + \begin{pmatrix} t_x \\ t_y \\ t_z \end{pmatrix} \quad (4)$$

where

R is a matrix in relation to rotation;

T is a matrix in relation to parallel shift.

The relationship between the world coordinates and the camera coordinates at the teaching time is defined as follows.

$$\begin{pmatrix} X_c \\ y_c \\ Z_c \end{pmatrix} = \begin{pmatrix} x_w \\ y_w \\ 0 \end{pmatrix} + \begin{pmatrix} 0 \\ 0 \\ t_{z0} \end{pmatrix} \quad (5)$$

where $t_{z0}$ is the installation height of the pickup sensor (known).

From the equation (5), $$X_c = X_w, \ y_c = y_w, \ Z_c = t_{z0} \quad (6)$$

The projection conversion from the camera coordinates to the image coordinates is given by the following equation.

$$X_g = \frac{f}{Z_c} X_c, \ y_g = \frac{f}{Z_c} y_c \quad (7)$$

where f is the focal distance.

Letting $m_0 = t_{z0}/f$ and using the equation (6), the equation (7) can be rewritten as follows.

$$\left. \begin{array}{l} X_g = \dfrac{f}{Z_c} X_c = \dfrac{f}{t_{x0}} X_w = \dfrac{1}{m_0} X_w \\ y_g = \dfrac{f}{Z_c} y_c = \dfrac{f}{T_{z0}} y_w = \dfrac{1}{m_0} y_w \end{array} \right\} \quad (8)$$

Now let us consider the working time. From the equations (4) and (8), the camera coordinates $X_c'$ ($x_c'$, $y_c'$, $z_c'$) can be expressed as follows.

$$\begin{pmatrix} X_c' \\ Y_c' \\ X_c' \end{pmatrix} = R \begin{pmatrix} X_w \\ Y_w \\ 0 \end{pmatrix} + \begin{pmatrix} t_x \\ t_y \\ t_z \end{pmatrix} \quad (9)$$

$$= \begin{pmatrix} r_{11} X_w + r_{12} y_w + t_x \\ r_{21} X_w + r_{22} y_w + t_y \\ r_{31} X_w + r_{32} y_w + t_z \end{pmatrix}$$

$$= \begin{pmatrix} r_{11} m_0 X_g + r_{12} m_0 y_g + t_x \\ r_{21} m_0 X_g + r_{22} m_0 y_g + t_y \\ r_{31} m_0 X_g + r_{32} m_0 y_g + t_z \end{pmatrix}$$

The projection conversion from the camera coordinates to the image coordinates is expressed by the following equation.

$$X'_g = \frac{f}{Z'_c} X'_c, \quad y'_g \frac{f}{Z'_c} y'_c \qquad (10)$$

Using the equation (9), the equation about x in the equation (10) is expressed as follows.

$$(r_{31} m_0 X_g + r_{32} m_0 y_g + t_z) X'_g = f(r_{11} m_0 X_g + r_{12} m_0 Y_g + t_x) \qquad (11)$$

Given that $t_z = t_{z0}(1+\delta)$, ($t_{z0}\delta$: a change in the height of the pickup sensor), $$\frac{f}{t_z} = \frac{f}{t_{z0}(1+\delta)} = \frac{1}{m_0(1+\delta)} \qquad (12)$$

from which the following relation can be derived.

$$t_z = fm_0(1+\delta) \qquad (13)$$

Substituting the equation (13) into the equation (11) yields;

$$r_{31} m_0 X_g X'_g + r_{32} m_0 y_g X'_g + fm_0(1+\delta) X'_g = r_{11} fm_0 X_g + r_{12} fm_0 y_g + ft_x$$

Multiplying both sides of the equation by $1/fm_0(1+\delta)$ and rearranging the resultant equation yields $$\frac{r_{11}}{(1+\delta)} X_g + \frac{r_{12}}{1+\delta} y_g - \qquad (14)$$

$$\frac{r_{31}}{f(1+\delta)} X_g X'_g - \frac{r_{32}}{f(1+\delta)} y_g X'_g + \frac{t_x}{m_0(1+\delta)} = X'_g$$

Let $$r_{11} = (1+\delta) R_{11}, \quad r_{12} = (1+\delta) R_{12}$$

$$r_{21} = (1+\delta) R_{21}, \quad r_{22} = (1+\delta) R_{22}$$

$$r_{31} = (1+\delta) f R_{31}, \quad r_{32} = (1+\delta) f R_{32}$$

$$t_x = m_0(1+\delta) T_x, \quad t_y = m_0(1+\delta) T_y \qquad (15)$$

then, the equation (14) becomes as follows, $$R_{11} X_g + R_{12} y_g - R_{31} X_g X'_g - R_{32} y_g X'_g + T_x = X'_g \qquad (16)$$

Modifying the equation about y in the equation (10) in a similar manner yields the following equation.

$$R_{21} X_g + R_{22} y_g - R_{31} X_g y'_g - R_{32} y_g y'_g + T_y = y'_g \qquad (17)$$

If four sets ($x_g$, $y_g$, $x'_g$, $y'_g$) or more of the associated reference position data and on-pause position data are applied to the equations (16) and (17), the values of $R_{11}$, $R_{12}$, $R_{21}$, $R_{22}$, $R_{31}$, $R_{32}$, $T_x$ and $T_y$ are obtained by using the least squares method.

In the equation (4), the following relations are satisfied, $$r_{11}^2 + r_{21}^2 + r_{31}^2 = 1$$

$$r_{12}^2 + r_{22}^2 + r_{32}^2 = 1 \qquad (18)$$

substituting the equation (15) into the equation (18) yields $$(1+\delta)^2 (R_{11}^2 + R_{21}^2 + f^2 R_{31}^2) = 1$$

$$(1+\delta)^2 (R_{12}^2 + R_{22}^2 + f^2 R_{32}^2) = 1 \qquad (19)$$

Then, f is given by the following equation.

$$f = \left( \frac{R_{11}^2 + R_{21}^2 - R_{12}^2 - R_{22}^2}{R_{32}^2 - R_{31}^2} \right)^{1/2} \qquad (20)$$

Substituting the equation (20) into the equation (19) yields an equation to express $\delta$.

$$\delta = \left\{ \left( \frac{R_{32}^2 - R_{31}^2}{R_{32}^2 (R_{11}^2 + R_{21}^2) - R_{31}^2 (R_{12}^2 + R_{22}^2)} \right)^{1/2} - 1 \right\} \qquad (21)$$

As the equations (20) and (21) are substituted in the individual equations (15), $r_{11}$ to $r_{32}$, $t_x$ and $t_y$ can be obtained. The acquired $t_x$ and $t_y$ are respectively the amounts of positional deviation dx and dy in the x direction and the y direction on a plane, and $t_{z0}\delta$ is the amount of positional deviation dz in the z direction or in the height direction.

Now, one example of a way to obtain the amounts of rotational deviation $d\theta$, $d\phi$ and $d\psi$ with respect to the individual coordinate axes will be explained using the obtained $r_{11}$ to $r_{32}$.

Figure 26:
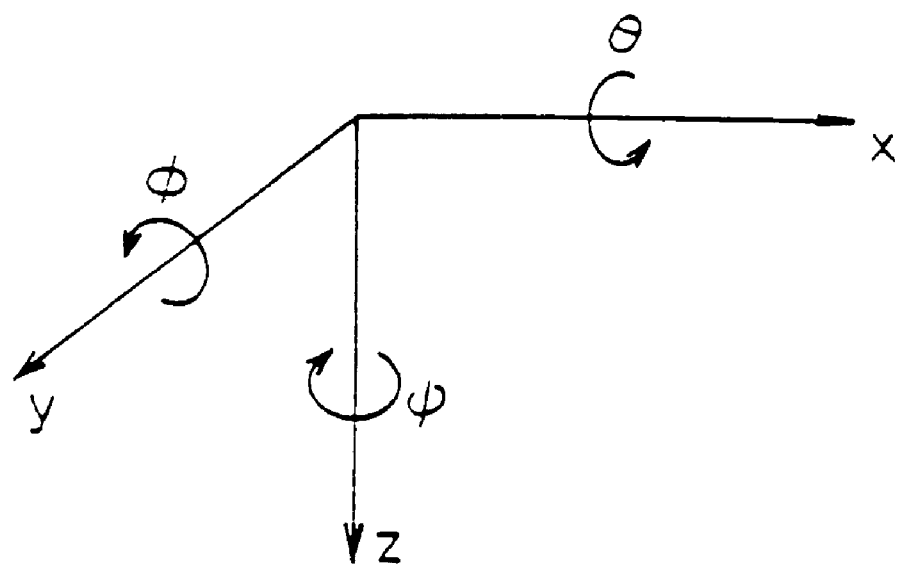
FIG. 26 is an explanatory diagram exemplifying the definitions of $\theta$, $\phi$ and $\psi$.

Let define $\theta$, $\phi$ and $\psi$ as shown in FIG. 26. Also let $$R = r_z \cdot r_y \cdot r_x \qquad (22)$$

where r is a matrix in relation to rotation.

then, the following relationship is obtained.

$$R = \begin{pmatrix} \cos\psi & -\sin\psi & 0 \\ \sin\psi & \cos\psi & 0 \\ 0 & 0 & 1 \end{pmatrix} \begin{pmatrix} \cos\phi & 0 & \sin\phi \\ 0 & 1 & 0 \\ -\sin\phi & 0 & \cos\phi \end{pmatrix} \begin{pmatrix} 1 & 0 & 0 \\ 0 & \cos\theta & -\sin\theta \\ 0 & \sin\theta & \cos\theta \end{pmatrix} \qquad (23)$$

$$= \begin{pmatrix} \cos\psi\cos\phi & \cos\psi\sin\phi\sin\theta - \sin\psi\cos\theta & \cos\psi\sin\phi\cos\theta + \sin\psi\sin\theta \\ \sin\psi\cos\phi & \sin\psi\sin\phi\sin\theta + \cos\psi\cos\theta & \sin\psi\sin\phi\cos\theta - \cos\psi\sin\theta \\ -\sin\phi & \sin\theta\cos\phi & \cos\phi\cos\theta \end{pmatrix}$$

From the relationship between equation (23) and $r_{11}$ to $r_{32}$, the amounts of rotational deviation $d\theta$, $d\phi$ and $d\psi$ can be obtained as follows.

$$d\theta = \sin^{-1}\left( \frac{r_{32}}{\sqrt{1 - r_{31}^2}} \right) \qquad (24)$$

$$d\phi = \sin^{-1}(-r_{31})$$

$$d\psi = \sin^{-1}\left( \frac{r_{21}}{\sqrt{1 - r_{31}^2}} \right)$$

Now, the actual computation for the amount of positional deviation in the calculation device 46 will be explained using the above-described computation of the amounts of three-dimensional positional deviation. The calculation device 46 extracts four sets ($x_g$, $y_g$, $x_g'$, $y_g'$) or more of the associated reference position data and on-pause position data, and applies those sets to the equations (16) and (17) to acquire the values of $R_{11}$, $R_{12}$, $R_{21}$, $R_{22}$, $R_{31}$, $R_{32}$, $T_x$ and $T_y$ by using the least squares method. Subsequently, the calculation device 46 obtains f and δ from the equations (20) and (21), and then substitutes them into the individual equations (15), yielding $r_{11}$ to $r_{32}$, $t_x$ and $t_y$. The acquired $t_x$ and $t_y$ are respectively, the amounts of positional deviation dx and dy in the x direction and the y direction on a plane, and $t_{z0}δ$ is the amount of positional deviation dz in the z direction or in the height direction. Then, substituting $r_{11}$ to $r_{32}$ into the equation (24) yields the amounts of rotational deviation dθ, dφ, and dψ.

As the calculation device 46 acquires the amounts of three-dimensional deviation of the stop position of the unmanned carriage 41 (dx, dy, dz, dθ, dφ, dψ) in the above manner, those amounts of positional deviation are sent to the body controller 40 to correct the stop position of the body, or are sent to the arm controller 48 to correct the teaching data of the arm.

As described above, the stop-position deviation detecting device A4 according to the embodiment 4 can acquire the amounts of three-dimensional deviation of the stop position of the unmanned carriage 41 (dx, dy, dz, dθ, dφ, dψ), so that in the case where the positional relationship between the body 41 (and the pickup sensor 44) and the floor surface 49 three-dimensionally varies between the teaching time and the working time, for example, like when a wheel falls into a punching hole 50, tilting the body, or the height position of the pickup sensor 44 from the floor surface 49 varies due to wearing of the wheels, the accurate amount of positional deviation can be detected. As only the position data of each punching hole on the picked image of the floor surface is used, it is sufficient to modify the program of the calculation device in the conventional stop-position deviation detecting device which acquires the amount of two-dimensional positional deviation and it is unnecessary to install a new measuring unit to measure the tilting of the body, for example.

Although the foregoing description of the above example has been given on the premise that punching holes are regularly laid on the floor surface, the punching holes need not be arranged regularly in the embodiment 4. Further, the property is not limited to the punching hole, but a specifiable mark or the like may be used as well.

The first aspect of this invention, as apparent from the above-described, there is provided a position correction apparatus for a working machine mounted on a mobile body for stopping the mobile body at a predetermined work position on a floor surface with a regular pattern formed thereon, and allowing the working machine to perform predetermined work according to teaching data, previously prepared and given to the working machine with the mobile body stopped at a reference stop position at the work position, which apparatus comprises image pickup means, provided on the mobile body at a position near the floor surface, for picking up an image on the floor surface where the mobile body stops; reference picked image acquiring means for, at a time of giving the teaching data to the working machine, for acquiring a reference picked image including an image of the regular pattern and an image of a identification mark provided on the floor surface in the vicinity of the predetermined work position, both acquired by the image pickup means with the mobile body stopped at the reference stop position of the work position; on-pause picked image acquiring means for acquiring an on-pause picked image including images of the regular pattern and the identification mark acquired by the image pickup means at a stop position of the mobile body when stopped; and teaching data correcting means for comparing the regular pattern in the reference picked image, obtained by the reference picked image acquiring means, with the regular pattern in the on-pause picked image, obtained by the on-pause picked image acquiring means, based on a position of said identification mark, and correcting the teaching data of the working machine based on a result of the comparison. It is therefore possible to carry out fast correcting in slight time from the point at which the mobile body has stopped to the beginning of the operation of the working machine, without operating movable portions, such as the working machine. As the working machine can quickly initiate the transfer work according to already corrected teaching data, therefore, the work time of the overall system does not increase.

If the identification mark is subjected to a surface treatment optically different from that of individual constituting elements of the regular pattern, the identification mark on the picked image has a different brightness from that of the pattern on the floor surface, thus ensuring easy detection of the identification mark from the picked image. This can assure more accurate image processing using the picked image so that an improvement on the precision of detection of the amount of positional deviation can be expected.

The available surface treatment may be a low reflection treatment, an irregular reflection treatment, or a mirror finish treatment. In the case of the mirror finish treatment, if the surface is further formed like a convex or concave spherical surface, even when the identification mark is not positioned directly under the image pickup means, intense reflection from the illumination surely appears on its surface so that a clear picked image can always be obtained by the image pickup means.

If the identification mark is embedded in the floor surface or is fitted in a through hole constituting the regular pattern, it is possible to prevent the identification mark from interfering with the running of the mobile body.

If an illuminator is provided near the image pickup means, and a reflector is provided to condense light emitted from the illuminator in a field of view of the image pickup means on the floor surface, the individual portions of the picked image have a uniform brightness. This ensures more accurate and easier image processing using the picked image so that a further improvement on the precision of detection of the amount of positional deviation can be expected.

A plurality of image pickup means may be provided with a predetermined positional relationship, and the teaching data correcting means may be designed to correct the teaching data of the working machine based on a result of comparison between the on-pause picked image and the reference picked image, both acquired by the plurality of image pickup means. This modification can detect the amount of positional deviation of the body of the mobile body based on a wider range of information, as in the case where image pickup means having a wider field of view including the image pickup areas of the plurality of image pickup means is used. Furthermore, the accuracy of image identification is not lowered. Therefore, it becomes possible to improve the accuracy of position deviation in the rotation direction without a pickup means having to use a special wide field of sight.

The second aspect of this invention, there is provided a stop-position deviation detecting device for obtaining a deviation between an on-pause picked image, acquired by picking up an image of a predetermined flat surface which has an arbitrary pattern and a predetermined identification mark formed thereon which a mobile body moves, with the mobile body stopped at a predetermined position, and a reference picked image, acquired by picking up an image of the flat surface, with the mobile body previously stopped at a predetermined reference stop position, by comparing the arbitrary patterns on the picked images with respect to the identification mark taken as a reference, thereby detecting an amount of deviation of the stop position of the mobile body based on the deviation, which apparatus comprises reference position data acquiring means for acquiring, from the reference picked image, position data of a plurality of pattern components constituting the arbitrary pattern and the identification mark on the reference picked image; on-pause position data acquiring means for acquiring, from the on-pause picked image, position data of the plurality of pattern components and the identification mark on the on-pause picked image; code assigning means for assigning common codes to the plurality of pattern components with the identification mark on each of the picked images taken as a reference; association means for associating the plurality of pattern components between the picked images in one-to-one correspondence based on the codes of the plurality of pattern components given by the code assigning means; and deviation calculation means for acquiring a difference between the position data acquired by the reference position data acquiring means and the on-pause position data acquiring means for each set of the plurality of pattern components associated with one another by the association means, and acquiring a deviation between the picked images based on the difference in the position data in each set. This apparatus is therefore adaptable to the case where a predetermined flat surface (for example, a floor surface) does not have a grating pattern, and is able to ensure high precision measurement due to the use of multiple sets of position data in acquiring positional and posture deviations. As position data of each of the pattern components is used, even a productional error if included in the position of any of the pattern components does not affect the measuring precision.

Further, the stop-position deviation detecting device may be modified in such a way that a predetermined number of pieces of position data are selected from said position data of said pattern components, obtained by said reference position data acquiring means and said on-pause position data acquiring means, and said association means performs an association process only on those pattern components corresponding to said selected position data. This structure can improve the processing speed and contribute to reducing the memory capacity while maintaining a certain degree of or greater precision.

The on-pause position data acquiring means may be designed to include rough position data acquiring means for acquiring rough position data of the plurality of pattern components; rough position data selection means for selecting a predetermined number of pieces of position data from the rough position data acquired by the rough position data acquiring means; and detailed position data acquiring means for acquiring detailed position data of the pattern components corresponding to the rough position data selected by the rough position data selection means. This structure can ensure faster processing and smaller memory capacity.

In the case where the arbitrary pattern is formed by regular arrangement of the plurality of pattern components, the code assigning means may be designed to assign codes based on regularity of the arrangement of the plurality of pattern components with the identification mark on each of the picked images taken as a reference. This can assure easier and surer code assignment.

If the arbitrary pattern is formed by irregular arrangement of the plurality of pattern components, the aforementioned code assigning means cannot be used. This case can be coped with a structural modification wherein the code assigning means assigns codes to individual pattern components on the reference picked image based on vectors connecting the plurality of pattern components in order on the reference picked image with the identification mark as a starting point, and assigns codes common to those on the reference picked image, on the on-pause picked image with the identification mark as a starting point, according to the vectors.

The reference position data acquiring means and the on-pause position data acquiring means may perform a matching process on a predetermined template image and images of the plurality of pattern components and the identification mark to recognize the plurality of pattern components and the identification mark to thereby acquire position data of the picked images. This can accomplish acquisition of highly accurate position data. In this case, if the plurality of pattern components of the arbitrary pattern are formed in the same circle, a fast matching process with fewer memory usage can be accomplished regardless of a pose deviation between the template image and each picked image, by using the image of one of the circular pattern components as the predetermined template image.

If the reference position data acquiring means and the on-pause position data acquiring means are designed to extract portions of binary images which have preset shape properties to recognize the plurality of pattern components and the identification mark to thereby acquire position data of the picked images, the binary images being obtained by binarizing individual picked images with a predetermined threshold value, the processing speed can be increased though the precision does not get higher than that of the previous matching process.

In the case where the plurality of pattern components constituting the arbitrary pattern, one or more pattern components are specifiable as the identification mark, such pattern components can be taken as a reference in the process executed by the code assigning means.

If the identification mark is subjected to a surface treatment optically different from that of individual constituting elements of the regular pattern, the identification mark on the picked image has a different brightness from that of the pattern on the floor surface, thus ensuring easy detection of the identification mark from the picked image. This can assure more accurate image processing using the picked image so that an improvement on the precision of detection of the amount of positional deviation can be expected.

The available surface treatment may be a low reflection treatment, an irregular reflection treatment, or a mirror finish treatment. In the case of the mirror finish treatment, if the surface is further formed like a convex or concave spherical surface, even when the identification mark is not positioned directly under the image pickup means, intense reflection from the illumination surely appears on its surface so that a clear picked image can always be obtained by the image pickup means.

If the identification mark is embedded in the floor surface or is fitted in a through hole constituting the regular pattern, it is possible to prevent the identification mark from interfering with the running of the mobile body.

If an illuminator is provided near the image pickup means, and a reflector is provided to condense light emitted from the illuminator in a field of view of the image pickup means on the floor surface, the individual portions of the picked image have a uniform brightness. This ensures more accurate and easier image processing using the picked image so that a further improvement on the precision of detection of the amount of positional deviation can be expected.

A plurality of image pickup means may be provided with a predetermined positional relationship, and the teaching data correcting means may be designed to correct the teaching data of the working machine based on a result of comparison between the on-pause picked image and the reference picked image, both acquired by the plurality of image pickup means. This modification can detect the amount of positional deviation of the body of the mobile body based on a wider range of information, as in the case where image pickup means having a wider field of view including the image pickup areas of the plurality of image pickup means is used. Furthermore, the accuracy of image identification is not lowered. Therefore, it becomes possible to improve the accuracy of position deviation in the rotation direction without a pickup means having to use a special wide field of sight.

The positional deviation detecting device may be designed in such a way that the amount of a three-dimensional deviation of the stop position of the mobile body is obtained based on only relationships among positions of the pattern components on the on-pause picked image and the reference picked image. This structure can accurately detect the amount of positional deviation even when the positional relationship between the mobile body and the flat surface (for example, a floor surface) changes three-dimensionally between the time of giving teaching data and the working time as in the case where, for example, the mobile body tilt due to falling of the wheels or the like or the height position of the image pickup means from the flat surface varies due to wearing of the wheels.

What is claimed is:

1. A position correcting apparatus for a working machine mounted on a mobile body for stopping said mobile body at a predetermined work position on a floor with a regular pattern formed thereon, and allowing said working machine to perform a predetermined operation according to teaching data, previously prepared and given to said working machine with said mobile body stopped at a reference stop position at said work position, comprising:

image pickup means, provided on said mobile body side at a position near said floor, for picking up an image on said floor where said mobile body stops;

reference picked image acquiring means for, at a time of giving said teaching data to said working machine, for acquiring a reference picked image including an image of said regular pattern and an image of a identification mark provided on said floor in vicinity of said predetermined work position, both acquired by said image pickup means with said mobile body stopped at said reference stop position of said work position;

on-pause picked image acquiring means for acquiring an on-pause picked image including images of said regular pattern and said identification mark acquired by said image pickup means at a stop position of said mobile body when stopped; and teaching data correction means for comparing said regular pattern in said reference picked image, obtained by said reference picked image acquiring means, with said regular pattern in said on-pause picked image, obtained by said on-pause picked image acquiring means, based on a position of said identification mark, and correcting said teaching data of said working machine based on a result of the comparison.

2. The position correcting apparatus for a working machine according to claim 1, wherein said teaching data correction means compares predetermined position information obtained from said regular pattern in said reference picked image with predetermined position information obtained from said regular pattern in said on-pause picked image, and corrects said teaching data of said working machine based on a result of the comparison.

3. The position correcting apparatus for a working machine according to claim 1, wherein said teaching data correction means compares image information of said regular pattern in said reference picked image with image information of said regular pattern in said on-pause picked image, and corrects said teaching data of said working machine based on a result of the comparison.

4. The position correcting apparatus for a working machine according to any one of claims 1 to 3, wherein said floor with said regular pattern is made of a punching member or a grating member.

5. The position correcting apparatus for a working machine according to any one of claims 1 to 4, wherein said identification mark is subjected to a surface treatment optically different from that of individual constituting elements of said regular pattern.

6. The position correcting apparatus for a working machine according to claim 5, wherein said surface treatment is a low reflection treatment or an irregular reflection treatment.

7. The position correcting apparatus for a working machine according to claim 5, wherein said surface treatment is a mirror finish treatment.

8. The position correcting apparatus for a working machine according to claim 7, wherein said mirror-finished identification mark has a convex or concave spherical surface.

9. The position correcting apparatus for a working machine according to any one of claims 1 to 8, wherein said identification mark is embedded in said floor.

10. The position correcting apparatus for a working machine according to any one of claims 1 to 9, wherein said identification mark is fitted in a through hole constituting said regular pattern.

11. The position correcting apparatus for a working machine according to any one of claims 1 to 10, further comprising:

an illuminator provided near said image pickup means; and a reflector for condensing light emitted from said illuminator in a field of view of said image pickup means on said floor.

12. The position correcting apparatus for a working machine according to any one of claims 1 to 11, wherein a plurality of image pickup means are provided with a predetermined position relationship; and said teaching data correction means corrects said teaching data of said working machine based on a result of comparison between said on-pause picked image and said reference picked image, both acquired by said plurality of image pickup means.

13. A stop-position deviation detecting device for obtaining a deviation between an on-pause picked image, acquired by picking up an image of a predetermined flat surface which has an arbitrary pattern and a predetermined identification mark formed thereon and on which a mobile body moves, with said mobile body stopped at a predetermined position, and a reference picked image, acquired by picking up an image of said flat surface, with said mobile body previously stopped at a predetermined reference stop position, by comparing said arbitrary patterns on said picked images with respect to said identification mark taken as a reference, thereby detecting an amount of deviation of said stop position of said mobile body based on said deviation, said apparatus comprising:

reference position data acquiring means for acquiring, from said reference picked image, position data of a plurality of pattern components constituting said arbitrary pattern and said identification mark on said reference picked image;

on-pause position data acquiring means for acquiring, from said on-pause picked image, position data of said plurality of pattern components and said identification mark on said on-pause picked image;

code assigning means for assigning common codes to said plurality of pattern components with said identification mark on each of said picked images taken as a reference;

associating means for associating said plurality of pattern components between said picked images in one-to-one correspondence based on said codes of said plurality of pattern components given by said code assigning means; and deviation calculation means for acquiring a difference between said position data acquired by said reference position data acquiring means and said on-pause position data acquiring means for each set of said plurality of pattern components associated with one another by said associating means, and acquiring a deviation between said picked images based on said difference in said position data in each set.

14. The stop-position deviation detecting device according to claim 13, wherein a predetermined number of pieces of position data are selected from said position data of said pattern components, obtained by said reference position data acquiring means and said on-pause position data acquiring means, and said associating means performs an association process only on those pattern components corresponding to said selected position data.

15. The stop-position deviation detecting device according to claim 13, wherein said on-pause position data acquired means includes:

rough position data acquiring means for acquiring rough position data of said plurality of pattern components;

rough position data selection means for selecting a predetermined number of pieces of position data from said rough position data acquired by said rough position data acquiring means; and detailed position data acquiring means for acquiring detailed position data of said pattern components corresponding to said rough position data selected by said rough position data selection means.

16. The stop-position deviation detecting device according to any one of claims 13 to 15, wherein said arbitrary pattern is formed by regular arrangement of said plurality of pattern components; and said code assigning means assigns codes based on regularity of the arrangement of said plurality of pattern components with said identification mark on each of said picked images taken as a reference.

17. The stop-position deviation detecting device according to any one of claims 13 to 15, wherein said code assigning means assigns codes to individual pattern components on said reference picked image based on vectors connecting said plurality of pattern components in order on said reference picked image with said identification mark as a starting point, and assigns codes common to those on said reference picked image, on said on-pause picked image with said identification mark as a starting point, according to said vectors.

18. The stop-position deviation detecting device according to any one of claims 13 to 17, wherein said reference position data acquiring means and said on-pause position data acquiring means perform a matching process on a predetermined template image and images of said plurality of pattern components and said identification mark to recognize said plurality of pattern components and said identification mark to thereby acquire position data of said picked images.

19. The stop-position deviation detecting device according to claim 18, wherein said plurality of pattern components of said arbitrary pattern are formed in the same circle; and an image of one of said circular components is used as said predetermined template image.

20. The stop-position deviation detecting device according to any one of claims 13 to 19, wherein said reference position data acquiring means and said on-pause position data acquiring means extract portions of binary images which have preset shape properties to recognize said plurality of pattern components and said identification mark to thereby acquire position data of said picked images, said binary images being obtained by binarizing individual picked images with a predetermined threshold value.

21. The stop-position deviation detecting device according to any one of claims 13 to 20, wherein said plurality of pattern components constituting said arbitrary pattern, one or two or more pattern components specifiable as said identification mark are taken as a reference in a process executed by said code assigning means.

22. The stop-position deviation detecting device according to any one of claims 13 to 21, wherein said predetermined flat surface is a floor made of a punching member or a grating member.

23. The stop-position deviation detecting device according to any one of claims 13 to 22, wherein said identification mark is subjected to a surface treatment optically different from that of said plurality of pattern components constituting said arbitrary pattern.

24. The stop-position deviation detecting device according to claim 23, wherein said surface treatment is a low reflection treatment or an irregular reflection treatment.

25. The stop-position deviation detecting device according to claim 23, wherein said surface treatment is a mirror finish treatment.

26. The stop-position deviation detecting device according to claim 25, wherein said mirror-finished identification mark has a convex or concave spherical surface.

27. The stop-position deviation detecting device according to any one of claims 13 to 26, wherein said identification mark is embedded in said floor.

28. The stop-position deviation detecting device according to any one of claims 13 to 27, wherein said identification mark is fitted in a through hole constituting said regular pattern.

29. The stop-position deviation detecting device according to any one of claims 13 to 28, further comprising:

an illuminator provided near said image pickup means; and a reflector for condensing light emitted from said illuminator in a field of view of said image pickup means on said floor.

30. The stop-position deviation detecting device according to any one of claims 13 to 29, wherein a plurality of image pickup means are provided with a predetermined position relationship; and a deviation between said picked images is acquired based on said on-pause picked image and said reference picked image, both acquired by said plurality of image pickup means.

31. The stop-position deviation detecting device according to any one of claims 13 to 30, wherein an amount of a three-dimensional deviation of said stop position of said mobile body is obtained based on relationships among positions of said pattern components on said on-pause picked image and said reference picked image.

* * * * *